(12) United States Patent
Satyan

(10) Patent No.: US 8,391,568 B2
(45) Date of Patent: Mar. 5, 2013

(54) SYSTEM AND METHOD FOR IMPROVED SCANNING OF FINGERPRINT EDGES

(75) Inventor: Pallavi Satyan, San Jose, CA (US)

(73) Assignee: Validity Sensors, Inc., San Jose, CA (US)

( * ) Notice: Subject to any disclaimer, the term of this patent is extended or adjusted under 35 U.S.C. 154(b) by 867 days.

(21) Appl. No.: 12/268,260

(22) Filed: Nov. 10, 2008

(65) Prior Publication Data

US 2010/0119124 A1 May 13, 2010

(51) Int. Cl.
*G06K 9/00* (2006.01)
(52) U.S. Cl. .......................................... 382/124
(58) Field of Classification Search ............... 382/125, 382/124
See application file for complete search history.

(56) References Cited

U.S. PATENT DOCUMENTS

| | | | |
|---|---|---|---|
| 4,151,512 A | 4/1979 | Rigannati et al. | |
| 4,225,850 A * | 9/1980 | Chang et al. ................ | 382/124 |
| 4,310,827 A | 1/1982 | Asi | |
| 4,353,056 A | 10/1982 | Tsikos | |
| 4,405,829 A | 9/1983 | Rivest et al. | |
| 4,525,859 A | 6/1985 | Bowles et al. | |
| 4,550,221 A | 10/1985 | Mabusth | |
| 4,580,790 A | 4/1986 | Doose | |
| 4,582,985 A | 4/1986 | Lofberg | |
| 4,758,622 A | 7/1988 | Gosselin | |
| 4,817,183 A | 3/1989 | Sparrow | |
| 5,076,566 A | 12/1991 | Kriegel | |
| 5,109,427 A | 4/1992 | Yang | |
| 5,140,642 A | 8/1992 | Hau et al. | |
| 5,305,017 A | 4/1994 | Gerpheide | |
| 5,319,323 A | 6/1994 | Fong | |
| 5,325,442 A | 6/1994 | Knapp | |
| 5,420,936 A | 5/1995 | Fitzpatrick et al. | |
| 5,422,807 A | 6/1995 | Mitra et al. | |
| 5,456,256 A | 10/1995 | Schneider et al. | |
| 5,543,591 A | 8/1996 | Gillespie et al. | |
| 5,569,901 A | 10/1996 | Bridgelall et al. | |

(Continued)

FOREIGN PATENT DOCUMENTS

DE 2213813 A1 10/1973
EP 0929028 A2 1/1998

(Continued)

OTHER PUBLICATIONS

Matsumoto et al., Impact of Artificial "Gummy" Fingers on Fingerprint Systems, SPIE 4677 (2002), reprinted from cryptome.org.

(Continued)

*Primary Examiner* — Hadi Akhavannik
(74) *Attorney, Agent, or Firm* — Greenberg Traurig LLP; Cecily Anne O'Regan; William C. Cray

(57) ABSTRACT

A fingerprint analysis method for partial fingerprint scanners that has an improved ability to resolve fingerprints from the tips of fingers, as well as an improved ability to cope with suboptimal finger swipes. The method uses various extrapolation methods to more accurately determine the position of a scanned fingertip is as the tip of the finger passes a partial fingerprint scanner. The method also monitors the image characteristics of the partial fingerprint image returned by the partial fingerprint scanner, and uses these image characteristics to determine exactly where the image of the fingertip itself is lost, and imaging of non-fingerprint data begins. By combining the most probable fingertip position as a function of time data obtained from extrapolated finger motion data, with image analyzed fingerprint images more precisely determined to be near the fingertip edges, superior fingerprint images extending closer to the edge of the fingerprint may be obtained.

25 Claims, 6 Drawing Sheets

U.S. PATENT DOCUMENTS

| | | | |
|---|---|---|---|
| 5,623,552 A | 4/1997 | Lane | |
| 5,627,316 A | 5/1997 | De Winter et al. | |
| 5,650,842 A | 7/1997 | Maase et al. | |
| 5,717,777 A | 2/1998 | Wong et al. | |
| 5,781,651 A | 7/1998 | Hsiao et al. | |
| 5,801,681 A | 9/1998 | Sayag | |
| 5,818,956 A | 10/1998 | Tuli | |
| 5,838,306 A | 11/1998 | O'Connor | |
| 5,848,176 A | 12/1998 | Hara et al. | |
| 5,850,450 A | 12/1998 | Schweitzer et al. | |
| 5,852,670 A | 12/1998 | Setlak et al. | |
| 5,864,296 A | 1/1999 | Upton | |
| 5,887,343 A | 3/1999 | Salatino et al. | |
| 5,892,824 A | 4/1999 | Beatson et al. | |
| 5,903,225 A | 5/1999 | Schmitt et al. | |
| 5,915,757 A | 6/1999 | Tsuyama et al. | |
| 5,920,384 A | 7/1999 | Borza | |
| 5,920,640 A | 7/1999 | Salatino et al. | |
| 5,940,526 A | 8/1999 | Setlak et al. | |
| 5,963,679 A | 10/1999 | Setlak | |
| 5,999,637 A | 12/1999 | Toyoda et al. | |
| 6,002,815 A | 12/1999 | Immega et al. | |
| 6,016,355 A | 1/2000 | Dickinson et al. | |
| 6,052,475 A | 4/2000 | Upton | |
| 6,067,368 A | 5/2000 | Setlak et al. | |
| 6,073,343 A | 6/2000 | Petrick et al. | |
| 6,076,566 A | 6/2000 | Lowe | |
| 6,088,585 A | 7/2000 | Schmitt et al. | |
| 6,098,175 A | 8/2000 | Lee | |
| 6,118,318 A | 9/2000 | Fifield et al. | |
| 6,134,340 A | 10/2000 | Hsu et al. | |
| 6,157,722 A | 12/2000 | Lerner et al. | |
| 6,161,213 A | 12/2000 | Lofstrom | |
| 6,175,407 B1 | 1/2001 | Sartor | |
| 6,182,076 B1 | 1/2001 | Yu et al. | |
| 6,182,892 B1 | 2/2001 | Angelo et al. | |
| 6,185,318 B1 | 2/2001 | Jain et al. | |
| 6,234,031 B1 | 5/2001 | Suga | |
| 6,241,288 B1 | 6/2001 | Bergenek et al. | |
| 6,259,108 B1 | 7/2001 | Antonelli et al. | |
| 6,289,114 B1 | 9/2001 | Mainguet | |
| 6,292,272 B1 | 9/2001 | Okauchi et al. | |
| 6,317,508 B1 | 11/2001 | Kramer et al. | |
| 6,320,394 B1 | 11/2001 | Tartagni | |
| 6,325,285 B1 | 12/2001 | Baratelli | |
| 6,332,193 B1 | 12/2001 | Glass et al. | |
| 6,333,989 B1 | 12/2001 | Borza | |
| 6,337,919 B1 | 1/2002 | Duton | |
| 6,346,739 B1 | 2/2002 | Lepert et al. | |
| 6,347,040 B1 | 2/2002 | Fries et al. | |
| 6,357,663 B1 | 3/2002 | Takahashi et al. | |
| 6,360,004 B1 | 3/2002 | Akizuki | |
| 6,362,633 B1 | 3/2002 | Tartagni | |
| 6,376,930 B1 | 4/2002 | Nagao et al. | |
| 6,392,636 B1 | 5/2002 | Ferrari et al. | |
| 6,399,994 B2 | 6/2002 | Shobu | |
| 6,400,836 B2 | 6/2002 | Senior | |
| 6,408,087 B1 | 6/2002 | Kramer | |
| 6,473,072 B1 | 10/2002 | Comiskey et al. | |
| 6,509,501 B2 | 1/2003 | Eicken et al. | |
| 6,525,547 B2 | 2/2003 | Hayes | |
| 6,525,932 B1 | 2/2003 | Ohnishi et al. | |
| 6,539,101 B1 | 3/2003 | Black | |
| 6,580,816 B2 | 6/2003 | Kramer et al. | |
| 6,597,289 B2 | 7/2003 | Sabatini | |
| 6,628,812 B1 | 9/2003 | Setlak et al. | |
| 6,631,201 B1 | 10/2003 | Dickinson et al. | |
| 6,643,389 B1 | 11/2003 | Raynal et al. | |
| 6,672,174 B2 | 1/2004 | Deconde et al. | |
| 6,710,461 B2 | 3/2004 | Chou et al. | |
| 6,738,050 B2 | 5/2004 | Comiskey et al. | |
| 6,741,729 B2 | 5/2004 | Bjorn et al. | |
| 6,757,002 B1 | 6/2004 | Oross et al. | |
| 6,766,040 B1 | 7/2004 | Catalano et al. | |
| 6,785,407 B1 | 8/2004 | Tschudi et al. | |
| 6,836,230 B2 | 12/2004 | Le Pailleur et al. | |
| 6,838,905 B1 | 1/2005 | Doyle | |
| 6,873,356 B1 | 3/2005 | Kanbe et al. | |
| 6,886,104 B1 | 4/2005 | McClurg et al. | |
| 6,897,002 B2 | 5/2005 | Teraoka et al. | |
| 6,898,299 B1 | 5/2005 | Brooks | |
| 6,924,496 B2 | 8/2005 | Manansala | |
| 6,937,748 B1 | 8/2005 | Schneider et al. | |
| 6,941,001 B1 | 9/2005 | Bolle et al. | |
| 6,941,810 B2 | 9/2005 | Okada | |
| 6,950,540 B2 | 9/2005 | Higuchi | |
| 6,959,874 B2 | 11/2005 | Bardwell | |
| 6,963,626 B1 | 11/2005 | Shaeffer et al. | |
| 6,970,584 B2 | 11/2005 | O'Gorman et al. | |
| 6,980,672 B2 | 12/2005 | Saito et al. | |
| 6,983,882 B2 | 1/2006 | Cassone | |
| 7,013,030 B2 | 3/2006 | Wong et al. | |
| 7,020,591 B1 | 3/2006 | Wei et al. | |
| 7,030,860 B1 | 4/2006 | Hsu et al. | |
| 7,031,670 B2 | 4/2006 | May | |
| 7,035,443 B2 | 4/2006 | Wong | |
| 7,042,535 B2 | 5/2006 | Katoh et al. | |
| 7,043,061 B2 | 5/2006 | Hamid et al. | |
| 7,043,644 B2 | 5/2006 | DeBruine | |
| 7,046,230 B2 | 5/2006 | Zadesky et al. | |
| 7,064,743 B2 | 6/2006 | Nishikawa | |
| 7,099,496 B2 | 8/2006 | Benkley, III | |
| 7,110,574 B2 | 9/2006 | Haruki et al. | |
| 7,110,577 B1 | 9/2006 | Tschud | |
| 7,113,622 B2 | 9/2006 | Hamid | |
| 7,126,389 B1 | 10/2006 | McRae et al. | |
| 7,129,926 B2 | 10/2006 | Mathiassen et al. | |
| 7,136,514 B1 | 11/2006 | Wong | |
| 7,146,024 B2 | 12/2006 | Benkley | |
| 7,146,026 B2 | 12/2006 | Russon et al. | |
| 7,146,029 B2 | 12/2006 | Manansala | |
| 7,184,581 B2 | 2/2007 | Johansen et al. | |
| 7,190,816 B2 | 3/2007 | Mitsuyu et al. | |
| 7,194,392 B2 | 3/2007 | Tuken et al. | |
| 7,197,168 B2 | 3/2007 | Russo | |
| 7,200,250 B2 | 4/2007 | Chou | |
| 7,251,351 B2 | 7/2007 | Mathiassen et al. | |
| 7,258,279 B2 | 8/2007 | Schneider et al. | |
| 7,260,246 B2 | 8/2007 | Fujii | |
| 7,263,212 B2 | 8/2007 | Kawabe | |
| 7,263,213 B2 * | 8/2007 | Rowe | 382/124 |
| 7,289,649 B1 | 10/2007 | Walley et al. | |
| 7,290,323 B2 | 11/2007 | Deconde et al. | |
| 7,308,121 B2 | 12/2007 | Mathiassen et al. | |
| 7,308,122 B2 | 12/2007 | McClurg et al. | |
| 7,321,672 B2 | 1/2008 | Sasaki et al. | |
| 7,356,169 B2 | 4/2008 | Hamid | |
| 7,360,688 B1 | 4/2008 | Harris | |
| 7,369,685 B2 | 5/2008 | DeLeon | |
| 7,379,569 B2 | 5/2008 | Chikazawa et al. | |
| 7,408,135 B2 | 8/2008 | Fujieda | |
| 7,409,876 B2 | 8/2008 | Ganapathi et al. | |
| 7,412,083 B2 | 8/2008 | Takahashi | |
| 7,424,618 B2 | 9/2008 | Roy et al. | |
| 7,447,339 B2 | 11/2008 | Mimura et al. | |
| 7,447,911 B2 | 11/2008 | Chou et al. | |
| 7,460,697 B2 | 12/2008 | Erhart et al. | |
| 7,463,756 B2 | 12/2008 | Benkley | |
| 7,505,611 B2 | 3/2009 | Fyke | |
| 7,505,613 B2 | 3/2009 | Russo | |
| 7,565,548 B2 | 7/2009 | Fiske et al. | |
| 7,574,022 B2 | 8/2009 | Russo | |
| 7,596,832 B2 | 10/2009 | Hsieh et al. | |
| 7,643,950 B1 | 1/2010 | Getzin et al. | |
| 7,646,897 B2 | 1/2010 | Fyke | |
| 7,681,232 B2 | 3/2010 | Nordentoft et al. | |
| 7,689,013 B2 | 3/2010 | Shinzaki | |
| 7,706,581 B2 | 4/2010 | Drews et al. | |
| 7,733,697 B2 | 6/2010 | Picca et al. | |
| 7,751,601 B2 | 7/2010 | Benkley | |
| 7,843,438 B2 | 11/2010 | Onoda | |
| 7,848,798 B2 | 12/2010 | Martinsen et al. | |
| 7,899,216 B2 | 3/2011 | Watanabe et al. | |
| 7,953,258 B2 | 5/2011 | Dean et al. | |
| 8,005,276 B2 | 8/2011 | Dean et al. | |
| 8,031,916 B2 | 10/2011 | Abiko et al. | |
| 8,077,935 B2 | 12/2011 | Geoffroy et al. | |

| | | |
|---|---|---|
| 8,107,212 B2 | 1/2012 | Nelson et al. |
| 8,116,540 B2 | 2/2012 | Dean et al. |
| 8,131,026 B2 | 3/2012 | Benkley et al. |
| 8,165,355 B2 | 4/2012 | Benkley et al. |
| 8,175,345 B2 | 5/2012 | Gardner |
| 8,204,281 B2 | 6/2012 | Satyan et al. |
| 2001/0026636 A1 | 10/2001 | Mainget |
| 2001/0030644 A1 | 10/2001 | Allport |
| 2001/0036299 A1 | 11/2001 | Senior |
| 2001/0043728 A1 | 11/2001 | Kramer et al. |
| 2002/0025062 A1 | 2/2002 | Black |
| 2002/0061125 A1 | 5/2002 | Fujii |
| 2002/0064892 A1 | 5/2002 | Lepert et al. |
| 2002/0067845 A1* | 6/2002 | Griffis ............................ 382/107 |
| 2002/0073046 A1 | 6/2002 | David |
| 2002/0089044 A1 | 7/2002 | Simmons et al. |
| 2002/0089410 A1 | 7/2002 | Janiak et al. |
| 2002/0096731 A1 | 7/2002 | Wu et al. |
| 2002/0122026 A1 | 9/2002 | Bergstrom |
| 2002/0126516 A1 | 9/2002 | Jeon |
| 2002/0133725 A1 | 9/2002 | Roy et al. |
| 2002/0152048 A1 | 10/2002 | Hayes |
| 2002/0181749 A1 | 12/2002 | Matsumoto et al. |
| 2003/0002717 A1 | 1/2003 | Hamid |
| 2003/0002719 A1 | 1/2003 | Hamid et al. |
| 2003/0021495 A1 | 1/2003 | Cheng |
| 2003/0035570 A1 | 2/2003 | Benkley |
| 2003/0063782 A1* | 4/2003 | Acharya et al. ................ 382/125 |
| 2003/0068072 A1 | 4/2003 | Hamid |
| 2003/0076301 A1 | 4/2003 | Tsuk et al. |
| 2003/0076303 A1 | 4/2003 | Huppi |
| 2003/0095096 A1 | 5/2003 | Robbin et al. |
| 2003/0095690 A1 | 5/2003 | Su et al. |
| 2003/0102874 A1 | 6/2003 | Lane et al. |
| 2003/0123714 A1 | 7/2003 | O'Gorman et al. |
| 2003/0123715 A1* | 7/2003 | Uchida ........................ 382/124 |
| 2003/0141959 A1 | 7/2003 | Keogh et al. |
| 2003/0147015 A1 | 8/2003 | Katoh et al. |
| 2003/0161510 A1 | 8/2003 | Fuji |
| 2003/0161512 A1 | 8/2003 | Mathiassen et al. |
| 2003/0169228 A1 | 9/2003 | Mathiassen et al. |
| 2003/0174871 A1 | 9/2003 | Yoshioka et al. |
| 2003/0186157 A1 | 10/2003 | Teraoka et al. |
| 2003/0209293 A1 | 11/2003 | Sako et al. |
| 2003/0224553 A1 | 12/2003 | Manansala |
| 2004/0012773 A1 | 1/2004 | Puttkammer |
| 2004/0017934 A1 | 1/2004 | Kocher |
| 2004/0022001 A1 | 2/2004 | Chu et al. |
| 2004/0042642 A1 | 3/2004 | Bolle et al. |
| 2004/0050930 A1 | 3/2004 | Rowe |
| 2004/0066613 A1 | 4/2004 | Leitao |
| 2004/0076313 A1 | 4/2004 | Bronstein et al. |
| 2004/0081339 A1 | 4/2004 | Benkley |
| 2004/0096086 A1 | 5/2004 | Miyasaka et al. |
| 2004/0113956 A1 | 6/2004 | Bellwood et al. |
| 2004/0120400 A1 | 6/2004 | Linzer |
| 2004/0125993 A1 | 7/2004 | Zhao et al. |
| 2004/0129787 A1 | 7/2004 | Saito et al. |
| 2004/0136612 A1 | 7/2004 | Meister et al. |
| 2004/0155752 A1 | 8/2004 | Radke |
| 2004/0172339 A1 | 9/2004 | Snelgrove et al. |
| 2004/0179718 A1 | 9/2004 | Chou |
| 2004/0184641 A1 | 9/2004 | Nagasaka et al. |
| 2004/0190761 A1 | 9/2004 | Lee |
| 2004/0208346 A1 | 10/2004 | Baharav et al. |
| 2004/0208347 A1 | 10/2004 | Baharav et al. |
| 2004/0208348 A1 | 10/2004 | Baharav et al. |
| 2004/0213441 A1 | 10/2004 | Tschudi |
| 2004/0215689 A1 | 10/2004 | Dooley et al. |
| 2004/0228505 A1 | 11/2004 | Sugimoto |
| 2004/0228508 A1 | 11/2004 | Shigeta |
| 2004/0240712 A1 | 12/2004 | Rowe et al. |
| 2004/0252867 A1 | 12/2004 | Lan et al. |
| 2005/0031174 A1 | 2/2005 | Ryhanen et al. |
| 2005/0036665 A1 | 2/2005 | Higuchi |
| 2005/0047485 A1 | 3/2005 | Khayrallah et al. |
| 2005/0100196 A1 | 5/2005 | Scott et al. |
| 2005/0100938 A1 | 5/2005 | Hofmann et al. |
| 2005/0109835 A1 | 5/2005 | Jacoby et al. |
| 2005/0110103 A1 | 5/2005 | Setlak |
| 2005/0111708 A1 | 5/2005 | Chou |
| 2005/0123176 A1 | 6/2005 | Ishii et al. |
| 2005/0129291 A1 | 6/2005 | Boshra |
| 2005/0136200 A1 | 6/2005 | Durell et al. |
| 2005/0139656 A1 | 6/2005 | Arnouse |
| 2005/0139685 A1 | 6/2005 | Kozlay |
| 2005/0162402 A1 | 7/2005 | Watanachote |
| 2005/0169503 A1 | 8/2005 | Howell et al. |
| 2005/0174015 A1 | 8/2005 | Scott et al. |
| 2005/0210271 A1 | 9/2005 | Chou et al. |
| 2005/0219200 A1 | 10/2005 | Weng |
| 2005/0220329 A1* | 10/2005 | Payne et al. .................. 382/124 |
| 2005/0231213 A1 | 10/2005 | Chou et al. |
| 2005/0238212 A1 | 10/2005 | Du et al. |
| 2005/0244038 A1 | 11/2005 | Benkley |
| 2005/0244039 A1 | 11/2005 | Geoffroy et al. |
| 2005/0247559 A1 | 11/2005 | Frey et al. |
| 2005/0249386 A1 | 11/2005 | Juh |
| 2005/0258952 A1 | 11/2005 | Utter et al. |
| 2005/0269402 A1 | 12/2005 | Spitzer et al. |
| 2006/0006224 A1 | 1/2006 | Modi |
| 2006/0055500 A1 | 3/2006 | Burke et al. |
| 2006/0066572 A1 | 3/2006 | Yumoto et al. |
| 2006/0078176 A1 | 4/2006 | Abiko et al. |
| 2006/0083411 A1 | 4/2006 | Benkley |
| 2006/0110537 A1 | 5/2006 | Huang et al. |
| 2006/0140461 A1 | 6/2006 | Kim et al. |
| 2006/0144953 A1 | 7/2006 | Takao |
| 2006/0170528 A1 | 8/2006 | Fukushige et al. |
| 2006/0187200 A1 | 8/2006 | Martin |
| 2006/0210082 A1 | 9/2006 | Devadas et al. |
| 2006/0214512 A1 | 9/2006 | Iwata |
| 2006/0239514 A1 | 10/2006 | Watanabe et al. |
| 2006/0249008 A1 | 11/2006 | Luther |
| 2006/0259873 A1 | 11/2006 | Mister |
| 2006/0261174 A1 | 11/2006 | Zellner et al. |
| 2006/0267385 A1 | 11/2006 | Steenwyk et al. |
| 2006/0271793 A1 | 11/2006 | Devadas et al. |
| 2006/0285728 A1* | 12/2006 | Leung et al. ................... 382/124 |
| 2006/0287963 A1 | 12/2006 | Steeves et al. |
| 2007/0031011 A1 | 2/2007 | Erhart et al. |
| 2007/0036400 A1 | 2/2007 | Watanabe et al. |
| 2007/0057763 A1 | 3/2007 | Blattner et al. |
| 2007/0067828 A1 | 3/2007 | Bychkov |
| 2007/0076926 A1 | 4/2007 | Schneider et al. |
| 2007/0076951 A1 | 4/2007 | Tanaka et al. |
| 2007/0086634 A1 | 4/2007 | Setlak et al. |
| 2007/0090312 A1 | 4/2007 | Stallinga et al. |
| 2007/0138299 A1 | 6/2007 | Mitra |
| 2007/0154072 A1* | 7/2007 | Taraba et al. .................. 382/124 |
| 2007/0160269 A1 | 7/2007 | Kuo |
| 2007/0180261 A1 | 8/2007 | Akkermans et al. |
| 2007/0196002 A1 | 8/2007 | Choi et al. |
| 2007/0198141 A1 | 8/2007 | Moore |
| 2007/0198435 A1 | 8/2007 | Siegal et al. |
| 2007/0228154 A1 | 10/2007 | Tran |
| 2007/0237366 A1 | 10/2007 | Maletsky |
| 2007/0248249 A1 | 10/2007 | Stoianov |
| 2008/0002867 A1 | 1/2008 | Mathiassen et al. |
| 2008/0013805 A1 | 1/2008 | Sengupta et al. |
| 2008/0019578 A1 | 1/2008 | Saito et al. |
| 2008/0049987 A1 | 2/2008 | Champagne et al. |
| 2008/0049989 A1 | 2/2008 | Iseri et al. |
| 2008/0063245 A1* | 3/2008 | Benkley et al. ................ 382/124 |
| 2008/0069412 A1 | 3/2008 | Champagne et al. |
| 2008/0126260 A1 | 5/2008 | Cox et al. |
| 2008/0169345 A1 | 7/2008 | Keane et al. |
| 2008/0170695 A1 | 7/2008 | Adler et al. |
| 2008/0175450 A1 | 7/2008 | Scott |
| 2008/0178008 A1 | 7/2008 | Takahashi et al. |
| 2008/0179112 A1 | 7/2008 | Qin et al. |
| 2008/0185429 A1 | 8/2008 | Saville |
| 2008/0201265 A1 | 8/2008 | Hewton |
| 2008/0205714 A1 | 8/2008 | Benkley et al. |
| 2008/0219521 A1 | 9/2008 | Benkley et al. |
| 2008/0222049 A1 | 9/2008 | Loomis et al. |
| 2008/0223925 A1 | 9/2008 | Saito et al. |
| 2008/0226132 A1 | 9/2008 | Gardner |

| | | | |
|---|---|---|---|
| 2008/0240523 A1 | 10/2008 | Benkley et al. | |
| 2008/0244277 A1 | 10/2008 | Orsini et al. | |
| 2008/0267462 A1 | 10/2008 | Nelson et al. | |
| 2008/0279373 A1 | 11/2008 | Erhart et al. | |
| 2008/0317290 A1 | 12/2008 | Tazoe | |
| 2009/0130369 A1 | 5/2009 | Huang et al. | |
| 2009/0153297 A1 | 6/2009 | Gardner | |
| 2009/0154779 A1 | 6/2009 | Satyan et al. | |
| 2009/0155456 A1 | 6/2009 | Benkley et al. | |
| 2009/0169071 A1 | 7/2009 | Bond et al. | |
| 2009/0174974 A1 | 7/2009 | Huang et al. | |
| 2009/0237135 A1 | 9/2009 | Ramaraju et al. | |
| 2009/0252384 A1 | 10/2009 | Dean et al. | |
| 2009/0252385 A1 | 10/2009 | Dean et al. | |
| 2009/0252386 A1 | 10/2009 | Dean et al. | |
| 2009/0279742 A1 | 11/2009 | Abiko | |
| 2009/0319435 A1 | 12/2009 | Little et al. | |
| 2009/0324028 A1 | 12/2009 | Russo | |
| 2010/0026451 A1 | 2/2010 | Erhart et al. | |
| 2010/0045705 A1 | 2/2010 | Vertegaal et al. | |
| 2010/0083000 A1 | 4/2010 | Kesanupalli et al. | |
| 2010/0123675 A1 | 5/2010 | Ippel | |
| 2010/0127366 A1 | 5/2010 | Bond et al. | |
| 2010/0176823 A1 | 7/2010 | Thompson et al. | |
| 2010/0176892 A1 | 7/2010 | Thompson et al. | |
| 2010/0177940 A1 | 7/2010 | Thompson et al. | |
| 2010/0180136 A1 | 7/2010 | Thompson et al. | |
| 2010/0189314 A1 | 7/2010 | Benkley et al. | |
| 2010/0208953 A1 | 8/2010 | Gardner et al. | |
| 2010/0244166 A1 | 9/2010 | Shibuta et al. | |
| 2010/0272329 A1 | 10/2010 | Benkley | |
| 2010/0284565 A1 | 11/2010 | Benkley et al. | |
| 2011/0002461 A1 | 1/2011 | Erhart et al. | |
| 2011/0018556 A1 | 1/2011 | Le et al. | |
| 2011/0090047 A1 | 4/2011 | Patel | |
| 2011/0102567 A1 | 5/2011 | Erhart | |
| 2011/0102569 A1 | 5/2011 | Erhart | |
| 2011/0175703 A1 | 7/2011 | Benkley | |
| 2011/0176037 A1 | 7/2011 | Benkley, III | |
| 2011/0182486 A1 | 7/2011 | Valfridsson et al. | |
| 2011/0214924 A1 | 9/2011 | Perezselsky et al. | |
| 2011/0267298 A1 | 11/2011 | Erhart et al. | |
| 2011/0298711 A1 | 12/2011 | Dean et al. | |
| 2011/0304001 A1 | 12/2011 | Erhart et al. | |
| 2012/0044639 A1 | 2/2012 | Garcia | |

FOREIGN PATENT DOCUMENTS

| | | |
|---|---|---|
| EP | 0905646 A1 | 3/1999 |
| EP | 0973123 A1 | 1/2000 |
| EP | 1018697 A2 | 7/2000 |
| EP | 1139301 A2 | 10/2001 |
| EP | 1531419 A2 | 5/2005 |
| EP | 1533759 A1 | 5/2005 |
| EP | 1538548 A2 | 6/2005 |
| EP | 1624399 B1 | 2/2006 |
| EP | 1775674 A1 | 4/2007 |
| EP | 1939788 A1 | 7/2008 |
| GB | 2331613 A | 5/1999 |
| GB | 2480919 | 12/2011 |
| JP | 01094418 A2 | 4/1989 |
| JP | 04158434 A2 | 6/1992 |
| JP | 2005011002 A | 1/2005 |
| JP | 2005242856 | 9/2005 |
| JP | 2007305097 A | 11/2007 |
| TW | 200606745 A | 2/2006 |
| TW | 200620140 A | 6/2006 |
| TW | 200629167 A | 8/2006 |
| WO | WO 90/03620 A1 | 4/1990 |
| WO | WO 98/58342 A1 | 12/1998 |
| WO | WO 99/28701 A1 | 6/1999 |
| WO | WO 99/43258 A1 | 9/1999 |
| WO | WO 01/22349 A1 | 3/2001 |
| WO | WO 01/94902 A2 | 12/2001 |
| WO | WO 01/94902 A3 | 12/2001 |
| WO | WO 01/95304 A1 | 12/2001 |
| WO | WO 02/11066 A1 | 2/2002 |
| WO | WO 02/47018 A2 | 6/2002 |
| WO | WO 02/47018 A3 | 6/2002 |
| WO | WO 02/61668 A1 | 8/2002 |
| WO | WO 02/077907 A1 | 10/2002 |
| WO | WO 03/063054 A2 | 7/2003 |
| WO | WO 03/075210 A2 | 9/2003 |
| WO | WO 2004/066194 A1 | 8/2004 |
| WO | WO 2004/066693 A1 | 8/2004 |
| WO | WO 2005/104012 A1 | 11/2005 |
| WO | WO 2005/106774 A2 | 11/2005 |
| WO | WO 2005/106774 A3 | 11/2005 |
| WO | WO 2006/040724 | 4/2006 |
| WO | WO 2006/041780 A1 | 4/2006 |
| WO | WO 2007/011607 A1 | 1/2007 |
| WO | WO 2008/033264 A2 | 3/2008 |
| WO | WO 2008/033264 A3 | 3/2008 |
| WO | WO 2008/033265 A2 | 6/2008 |
| WO | WO 2008/033265 A3 | 6/2008 |
| WO | WO 2008/137287 A1 | 11/2008 |
| WO | WO 2009/002599 A2 | 12/2008 |
| WO | WO 2009/002599 A3 | 12/2008 |
| WO | WO 2009/029257 A1 | 6/2009 |
| WO | WO 2009/079219 A1 | 6/2009 |
| WO | WO 2009/079221 A2 | 6/2009 |
| WO | WO 2009/079257 A1 | 6/2009 |
| WO | WO 2009/079262 A1 | 6/2009 |
| WO | WO 2010/034036 A1 | 3/2010 |
| WO | WO 2010/036445 A1 | 4/2010 |
| WO | WO 2010/143597 A1 | 12/2010 |
| WO | WO 2011/088248 A1 | 1/2011 |
| WO | WO/2011/088252 A1 | 1/2011 |
| WO | WO 2011/053797 | 5/2011 |

OTHER PUBLICATIONS

Maltoni, "Handbook of Fingerprint Recognition", XP002355942 Springer, New York, USA, Jun. 2003 pp. 65-69.
Vermasan, et al., "A500 dpi AC Capacitive Hybrid Flip-Chip CMOS ASIC/Sensor Module for Fingerprint, Navigation, and Pointer Detection With On-Chip Data Processing", IEEE Journal of Solid State Circuits, vol. 38, No. 12, Dec. 2003, pp. 2288-2294.
Ratha, et al. "Adaptive Flow Orientation Based Feature Extraction in Fingerprint Images," Pattern Recognition, vol. 28 No. 11, 1657-1672, Nov. 1995.
Ratha, et al., "A Real Time Matching System for Large Fingerprint Databases," IEEE, Aug. 1996.
Suh, et al., "Design and Implementation of the AEGIS Single-Chip Secure Processor Using Physical Random Functions", Computer Architecture, 2005, ISCA '05, Proceedings, 32nd International Symposium, Jun. 2005 (MIT Technical Report CSAIL CSG-TR-843, 2004.
Rivest, et al., "A Method for Obtaining Digital Signatures and Public-Key Cryptosystems", Communication of the ACM, vol. 21 (2), pp. 120-126. (1978).
Hiltgen, et al., "Secure Internet Banking Authentication", IEEE Security and Privacy, IEEE Computer Society, New York, NY, US, Mar. 1, 2006, pp. 24-31, XP007908655, ISSN: 1540-7993.
Hegt, "Analysis of Current and Future Phishing Attacks on Internet Banking Services", Mater Thesis. Techische Universiteit Eindhoven—Department of Mathematics and Computer Science May 31, 2008, pp. 1-149, XP002630374, Retrieved from the Internet: URL:http://alexandria.tue.nl/extra1/afstversl/wsk-i/hgt2008.pdf [retrieved on Mar. 29, 2011] pp. 127-134, paragraph 6.2.
Gassend, et al., "Controlled Physical Random Functions", In Proceedings of the 18th Annual Computer Security Conference, Las Vegas, Nevada, Dec. 12, 2002.
Wikipedia (Mar. 2003). "Integrated Circuit," http://en.wikipedia.org/wiki/integrated_circuit. Revision as of Mar. 23, 2003.
Wikipedia (Dec. 2006). "Integrated circuit" Revision as of Dec. 10, 2006. http://en.widipedia.org/wiki/Integrated_circuit.
Bellagiodesigns.Com (Internet Archive Wayback Machine, www.bellagiodesigns.com date: Oct. 29, 2005).
Closed Loop Systems, The Free Dictionary, http://www.thefreedictionary.com/closed-loop+system (downloaded Dec. 1, 2011).
Feedback: Electronic Engineering, Wikipedia, p. 5 http://en.wikipedia.org/wiki/Feedback#Electronic_engineering (downloaded Dec. 1, 2011).
Galy et al. (Jul. 2007) "A full fingerprint verification system for a single-line sweep sensor." IEEE Sensors J., vol. 7 No. 7, pp. 1054-1065.

* cited by examiner

SYSTEM AND METHOD FOR IMPROVED SCANNING OF FINGERPRINT EDGES

BACKGROUND

Partial fingerprint scanners are becoming popular for a wide variety of security applications. In contrast to "all at once" fingerprint scanners, which capture an image of an entire fingerprint at the same time, partial fingerprint sensing devices use a sensing area that is smaller than the fingerprint area to be imaged. By imaging only a portion of a fingerprint at any given time, the size and cost of a partial fingerprint sensor can be made considerably smaller and cheaper than that of a full fingerprint sensor. However to capture a full fingerprint image, the user must move his finger and "swipe" it across the sensing zone of the partial finger print sensor.

Various types of partial fingerprint readers exist. Some work by optical means, some by pressure sensor means, and others by capacitance sensing means or radiofrequency sensing means.

For example, one common configuration used for a fingerprint sensor is a one or two dimensional array of CCD (charge coupled devices) or C-MOS circuit sensor elements (pixels). These components are embedded in a sensing surface to form a matrix of pressure sensing elements that generate signals in response to pressure applied to the surface by a finger. These signals are read by a processor and used to reconstruct the fingerprint of a user and to verify identification.

Other devices include one or two dimensional arrays of optical sensors that read light reflected off of a person's finger and onto an array of optical detectors. The reflected light is converted to a signal that defines the fingerprint of the finger analyzed and is used to reconstruct the fingerprint and to verify identification.

Many types of partial fingerprint scanners are comprised of linear (1 dimensional) arrays of sensing elements (pixels). These one dimensional sensors create a two dimensional image of a fingerprint through the relative motion of the finger pad relative to the sensor array.

One class of partial fingerprint sensors that are particularly useful for small device applications are deep finger penetrating radio frequency (RF) based sensors. These are described in U.S. Pat. Nos. 7,099,496; 7,146,024; and U.S. Publication Nos. US2003-0035570 A1; US2004-0081339 A1; US2005-0244038 A1; US 2005-0244039 A1; US2006-0083411 A1; US2007-0031011 A1, and the contents of these patents and patent applications are incorporated herein by reference. These types of sensors are commercially produced by Validity Sensors, Inc, San Jose Calif. This class of sensor mounts the sensing elements (usually arranged in a one dimensional array of conducting electrical traces) on a thin, flexible, and environmentally robust support, such as Kapton tape, and the IC used to drive the sensor is mounted in a protected location some distance away from the sensing zone. Such sensors are particularly advantageous in applications where small sensor size and sensor robustness are critical.

The Validity fingerprint sensors measure the intensity of electric fields conducted by finger ridges and valleys, such as deep finger penetrating radio frequency (RF) based sensing technology, and use this information to sense and create the fingerprint image. These devices create sensing elements by creating a linear array composed of many miniature excitation electrodes, spaced at a high density, such as a density of approximately 500 electrodes per inch. The tips of these electrodes are separated from a single sensing electrode by a small sensor gap. The electrodes are electrically excited in a progressive scan pattern and the ridges and valleys of a finger pad alter the electrical properties (usually the capacitive properties) of the excitation electrode—sensing electrode interaction, and this in turn creates a detectable electrical signal. The electrodes and sensors are mounted on thin flexible printed circuit support, and these electrodes and sensors are usually excited and the sensor read by an integrated circuit chip (scanner chip, driver chip, scan IC) designed for this purpose. The end result is to create a one dimensional "image" of the portion of the finger pad immediately over the electrode array and sensor junction.

As the finger surface is moved across the sensor, portions of the fingerprint are sensed and captured by the device's one dimensional scanner, creating an array of one dimensional images indexed by order of data acquisition, and/or alternatively annotated with additional time and/or finger pad location information. Circuitry, such as a computer processor or microprocessor, then creates a full two-dimensional fingerprint image by creating a mosaic of these one dimensional partial fingerprint images.

Often the processor will then compare this recreated two dimensional full fingerprint, usually stored in working memory, with an authorized fingerprint stored in a fingerprint recognition memory, and determine if there is a match or not. Software to perform fingerprint matching is disclosed in U.S. Pat. Nos. 7,020,591 and 7,194,392 by Wei et. al., and is commercially available from sources such as Cogent systems, Inc., South Pasadena, Calif.

If the scanned fingerprint matches the record of an authorized user, the processor then usually unlocks a secure area or computer system and allows the user access. This enables various types of sensitive areas and information (financial data, security codes, etc.), to be protected from unauthorized users, yet still be easily accessible to authorized users.

The main drawback of partial fingerprint sensors is that in order to obtain a valid fingerprint scan, the user must swipe his or her finger across the sensor surface in a relatively uniform manner. Unfortunately, due to various human factors issues, this usually isn't possible. In the real world, users will not swipe their fingers with a constant speed. Some will swipe more quickly than others, some may swipe at non-uniform speeds, and some may stop partially through a scan, and then resume. In order to account for this type of variation, modern partial fingerprint sensors often incorporate finger position or motion sensors to determine, relative to the partial fingerprint imager, exactly where on the fingerprint a particular partial fingerprint image comes from, and how the overall finger position and speed varies during a finger swipe. A finger position indicator can be used to derive finger motion and acceleration, and in this document, finger position indicators, finger motion (or movement) indicators, and finger acceleration indicators are used interchangeably.

One type of finger position/motion indicator, represented by U.S. Pat. No. 7,146,024, and U.S. Publication Nos. US2005-0244039 A1 and US2005-0244038 A1 (the contents of which are incorporated herein by reference) detects relative finger position using a long array of electrical drive plate sensors. These plates sense the bulk of a finger (rather than the fine details of the fingerprint ridges), and thus sense the relative position of the finger relative to the linear array used for fingerprint sensing. A second type of fingerprint position indicator, represented by U.S. Publication No. US2007-0031011 A1 (the contents of which are incorporated herein by reference), uses two linear partial fingerprint sensors, located about 400 microns apart. The two linear sensors use the slight timing differences that occur when a fingerprint swipe first hits one sensor and then the other sensor to detect when a fingerprint edge passes over the sensors. This technique can also detect relative speed of passage over the two partial sensors. This type of information can be used to deduce overall finger location during the course of a fingerprint swipe.

In either case, once finger position is known, each of the one-dimensional partial fingerprint images can then be annotated with additional (and optional) time data (time stamp) and/or finger (finger tip, finger pad, fingerprint location) location data (location stamp). This optional annotation information, which supplements the "order of data acquisition" that would normally be used to keep track of the multiple stored partial fingerprint images in memory, can be used to help to correct distortions (artifacts) when the various one dimensional partial images are assembled into a full two dimensional fingerprint image.

Although finger location or movement sensors are usually adequate to track finger motion in the middle of a finger swipe, such sensors often encounter difficulty near the end of a finger swipe. For example, consider the situation where a finger is swiped over a finger motion detector that consists of a series of plates, and the user swipes the finger using a motion that brings the tip of the finger towards the user (see FIGS. 1 and 2). During the early part of the swipe, the finger will rest on many plate detectors, and changes in the finger's position will be reported by many of these detectors. However near the end of the swipe, as the tip of the finger passes the final series of plate motion detectors, only a few plates now can report a finger motion signal, and these plates may tend to report noisier and less reliable finger location and motion information. Since high quality finger position data is needed in order to properly determine what portion of the fingertip is actually being monitored by the partial fingerprint imager at a given time, the position of the last few partial fingerprint images towards the end of the swipe can't be as precisely identified, and thus this data is of less utility in constructing an overall image of the fingertip.

Similarly, near the ends of a finger swipe, other types of finger location or motion detectors can also return inadequate finger position and velocity data. For all types of finger location or motion sensors, the consequence of misreported or non-reported finger position and motion data means that not all of the partial fingerprint images (particularly those obtained near the end of the swipe) can be localized to an accurate location on the user's fingerprint. Since most of these partial fingerprint imagers return only single line (one dimensional) partial fingerprint images, as might be imagined, such one dimensional images are of marginal or no value if their precise location on the fingerprint (e.g. their "Y" axis) can't be identified.

As a result, prior art partial fingerprint imaging systems (in particular the algorithms and computational parts of these systems) tended to cope with such problems by simply truncating the reported fingerprint image once the finger position data started to become less accurate. Often this meant that these prior art systems ended up completely discarding the partial fingerprint images from the edge of the fingerprint, such as from the fingertips.

This loss of fingerprint data was both unfortunate and suboptimal. Fingerprints are typically compared to a database of other fingerprints by some sort of pattern recognition process. As in all pattern recognition challenges, more data is better, and fingerprint analyzers that more efficiently and accurately report a larger portion of a fingerprint will tend to produce superior results in pattern recognition applications. There will be fewer mismatches, and a greater chance of successful matches.

Thus there is a need in the art for partial fingerprint systems that can report a larger portion of a user's fingerprint. In particular, there is a need for superior methods to analyze the data reported by partial fingerprint scanners and finger position sensors. As will be seen, the invention accomplishes this in an elegant manner.

DETAILED DESCRIPTION

Figure 1:
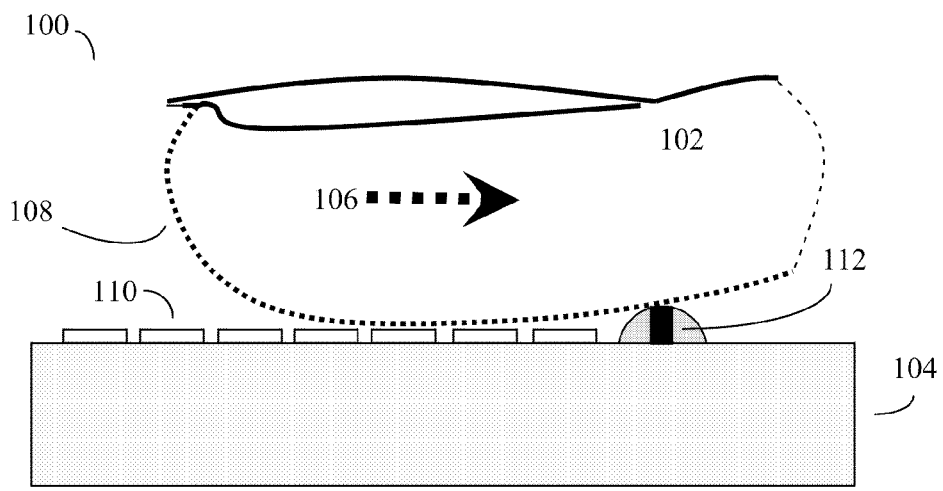
FIG. 1 shows a side view of a finger as it moves over a partial fingerprint scanner. This example also shows some of the finger motion detection problems, and partial fingerprint imaging problems, that can occur near the edges of a finger swipe.
Figure 1:
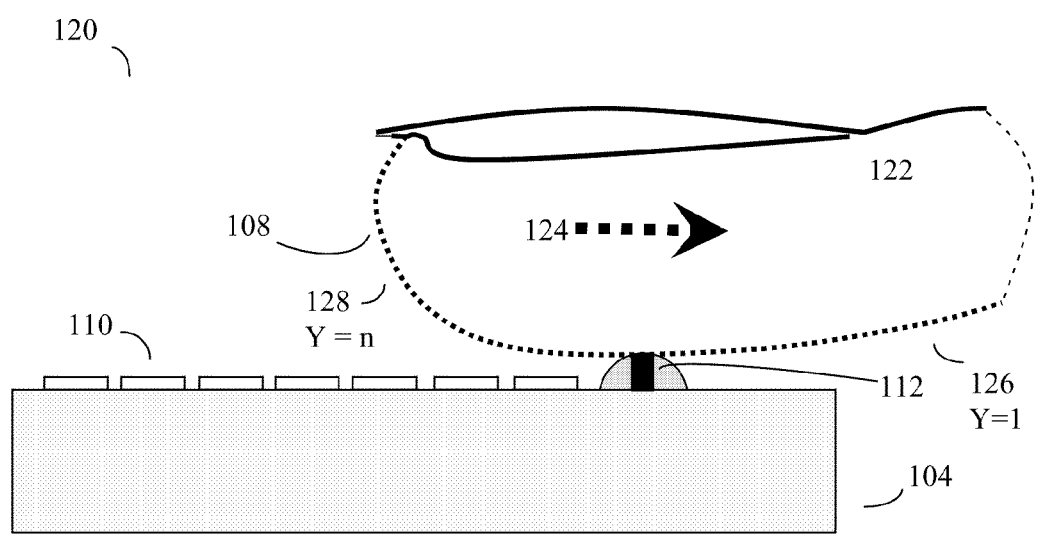

Although, throughout this disclosure, fingerprint edge correction is used as an example of the scanning problems and artifacts that can be corrected by the methods of the invention, it should be understood that these present methods are not limited to either fingerprint edge artifacts, or fingerprint scans. Alternative biometric imaging systems where the present techniques also may be useful include retinal scans, iris scans, hand prints, finger prints, and other types of scans. In general, any partial image scanning method, that depends upon an additional sensor to provide coordinates showing exactly where the partial image fits into the complete image, may potentially benefit from the present art.

The invention provides one or more fingerprint analysis methods and devices and systems for use in partial fingerprint scanners that have an improved ability to resolve fingerprints from the tips of fingers, as well as an improved ability to cope with suboptimal finger swipes. The methods use various extrapolation methods to more accurately determine the position of a scanned fingertip is as the tip of the finger passes a partial fingerprint scanner. The methods may also monitors the image characteristics of the partial fingerprint image returned by the partial fingerprint scanner, and may use these image characteristics to determine exactly where the image of the fingertip itself is lost, and where imaging of non-fingerprint data begins. By combining a probable fingertip position as a function of time data obtained from extrapolated finger motion data, with image analyzed fingerprint images more precisely determined to be near the fingertip edges, superior fingerprint images extending closer to the edge of the fingerprint may be obtained.

The invention provides a solution to the problem of inaccurate fingerprint detection at finger edges by teaching a method and device that has an improved ability to resolve fingerprints from the tips of fingers, as well as from the center of the finger.

This method is based upon the surprising experimental observation that although different users swipe their fingers through partial fingerprint scanners at different rates of speed and different accelerations, the typical finger acceleration at the end of the swipe is remarkably consistent between different users. The method also is based on certain predictable image patterns that occur near the edges of a fingerprint.

In this method, the acceleration of the finger while the center of the finger passes the partial fingerprint scanner is monitored, and this data is used to extrapolate what the most probable acceleration, velocity, and position of the fingertip is as the tip of the finger passes the partial fingerprint imager portion of the scanner.

Additionally, the image characteristics of the partial fingerprint image returned by the partial fingerprint scanner are analyzed, and these image characteristics are used to determine the most probable boundaries of the fingertip image, where the image of the fingertip itself is lost, and imaging of non-fingerprint data begins.

In other embodiments of this method, the most probable fingertip position as a function of time, obtained from extrapolated finger motion data, is combined with the most probable fingertip edge data obtained from image analysis. By using both new methods together, superior fingerprint data providing more complete coverage of fingerprint tips and edges may be obtained.

According to the invention, novel methods and related devices and systems are provided of assembling an image of a fingerprint from a series of partial fingerprint images and finger position data obtained by a partial fingerprint imager, such as a swipe sensor, a line sensor, or the like. In one method, the obtaining finger tip position data is obtained as the finger swipes the partial fingerprint image. The motion parameters versus time of the finger tip are determined. The method then compensates for inadequate finger position data by extrapolating the motion parameters to determine probable fingertip position versus time as the tip of the fingertip swipes over the partial fingerprint imager. The loss of precise fingertip motion parameters during at least a portion of the finger swipe may be compensated for by extrapolating the motion parameters.

The partial fingerprint images may be obtained using a partial fingerprint imager composed of a linear array of individual sensing elements. Alternatively, the partial fingerprint images may be obtained using a deep finger penetrating radio frequency (RF) based partial fingerprint imager. The partial fingerprint imager may have additional sensing elements capable of sensing the relative finger location or movement of the bulk of the finger. The motion parameters may be selected from the group consisting of finger acceleration, velocity, speed or distance. A coordinate or location of a partial fingerprint image in a complete fingerprint image may be computed by extrapolating the motion parameters.

In another method, the invention provides a method of assembling an image of a fingerprint from a series of partial fingerprint images composed of multiple pixels, each pixel having a pixel value. The method may include assembling an image of a fingerprint from a series of partial fingerprint images, where the partial fingerprint images are analyzed for the presence of non-fingerprint image data, and are rejected or deemphasized if the non-fingerprint data is detected. The partial fingerprint images may be obtained using a deep finger penetrating radio frequency (RF) based partial fingerprint imager.

In this method, the presence of non-fingerprint image data may be determined by a method selected from the group consisting of standard deviation, standard deviation squared, analysis of variance (ANOVA), analysis of covariance (ANCOVA), squared deviations, T-tests, and Fourier analysis of the pixel values within the individual partial fingerprint images. The method may be configured in a manner where the presence of non-fingerprint image data is determined by a method selected from the group consisting of standard deviation, standard deviation squared, analysis of variance (ANOVA), analysis of covariance (ANCOVA), squared deviations, T-tests, and Fourier analysis of the pixel values between the individual partial fingerprint images.

Assembling the image of a fingerprint further may include setting a weight parameter associated with each pixel, the weight parameter indicating the relative importance for that particular pixel for subsequent image analysis. The pixels may be consistent with the image being a fingerprint image (reliable pixels) may be given a weight parameter indicating that the reliable pixels are important for subsequent image analysis. The pixels consistent with the image being a non-fingerprint image (non-reliable pixels) may be deemphasized by being given a weight parameter indicating that non-reliable pixels are less important than the reliable pixels for subsequent image analysis. Assembling the image of a fingerprint further may include adjusting the pixel value associated with each pixel, the pixel value indicating the relative contrast between the height and dept of the fingerprint ridges. The pixels consistent with the image may be a fingerprint image (reliable pixels) treated so as to preserve the contrast between the relative height and depth of the fingerprint ridges. The pixels consistent with the image may be a non-fingerprint image (non-reliable pixels) are treated so as to diminish the contrast between the relative height and depth of the fingerprint ridges.

In another method, assembling an image of a fingerprint from a series of partial fingerprint images composed of multiple pixels, each pixel having a pixel value. The finger position data may be obtained by the partial fingerprint imager. The method may include obtaining a series of finger tip position data as the finger swipes the partial fingerprint imager, then determining the motion parameters versus time of the finger tip, and compensating for inadequate finger position data by extrapolating the motion parameters to determine probable fingertip position versus time as the tip of the fingertip swipes over the partial fingerprint imager. The method includes assembling an image of a fingerprint from a series of partial fingerprint images, analyzing the partial fingerprint images for the presence of non-fingerprint image data, processing the partial fingerprint images by rejecting or deemphasizing the partial fingerprint images, and combining the probable fingertip position versus time data with the processed partial fingerprint images.

The partial fingerprint images may be obtained using a partial fingerprint imager composed of a linear array of individual sensing elements. The partial fingerprint images may be obtained using a deep finger penetrating radio frequency (RF) based partial fingerprint imager. The partial fingerprint imager may have additional sensing elements capable of sensing the relative finger location or movement of the bulk of the finger. The image of a fingerprint may be subsequently analyzed versus a database of authorized fingerprint images for security verification purposes. The motion parameters may be selected from the group consisting of finger acceleration, velocity, or distance. Extrapolating the motion parameters may be used to compensate for the loss of precise fingertip motion parameters the final portions of the finger swipe.

The at least a portion of the finger swipe may be the final portion of the finger swipe where the tip of the finger can pass over the partial fingerprint imager. The presence of non-fingerprint image data may be determined by a method selected from the group consisting of standard deviation, standard deviation squared, analysis of variance (ANOVA), analysis of covariance (ANCOVA), squared deviations, T-tests, and Fourier analysis of the pixel values within the individual partial fingerprint images.

The presence of non-fingerprint image data is determined by a method selected from the group consisting of standard deviation, standard deviation squared, analysis of variance (ANOVA), analysis of covariance (ANCOVA), squared deviations, T-tests, and Fourier analysis of the pixel values between the individual partial fingerprint images.

A coordinate or location of the partial fingerprint image in a complete fingerprint image is computed by extrapolating the motion parameters.

The probable fingertip position versus time data with the processed partial fingerprint images may include selecting pixels, where both the probable fingertip position versus time data and the processed partial fingerprint images are in agreement that the pixel represents fingerprint data, and then rejecting pixels where both the probable fingertip position versus time data and the processed partial fingerprint images are in agreement that the pixel does not represent fingertip data.

Combining the probable fingertip position versus time data with the processed partial fingerprint images may further include setting a weight parameter associated with each pixel, the weight parameter indicating the relative importance for that particular pixel for subsequent image analysis. The probable fingertip position versus time data and the processed partial fingerprint images may be in agreement that the pixel does represent fingertip data (non-disputed pixels) are given a weight parameter indicating that the non-disputed pixels are important for subsequent image analysis. The probable fingertip position versus time data and processed partial fingerprint images may be in disagreement that the pixel represents fingertip data (disputed pixels) are given a weight parameter indicating that the disputed pixels are less important than the non-disputed pixels for subsequent image analysis.

Combining the probable fingertip position versus time data with the processed partial fingerprint images further may include adjusting the pixel value associated with each pixel, the pixel value indicating the relative contrast between the height and dept of the fingerprint ridges. The probable fingertip position versus time data and processed partial fingerprint images may be in agreement that the pixel does represent fingertip data (non-disputed pixels) are treated so as to preserve the contrast between the relative height and depth of the fingerprint ridges. The probable fingertip position versus time data and the processed partial fingerprint images may be in disagreement that the pixel represents fingertip data (disputed pixels) are treated so as to diminish the contrast between the relative height and depth of the fingerprint ridges.

As previously discussed, partial fingerprint sensors generally consist of a linear array of individual sensor units, typically packed closely together at high density, such as a density of about 500 sensing elements (dots, pixels) per inch. These individual sensing elements can detect the hills and valleys of the fingerprint ridges. Usually these sensors then digitize this information into an array of integers that characterize the relative elevation of the fingerprint ridges along the one dimensional array of the sensor. These integers are often values between 0-255 to give 8 bits of precision, but other values, such as 1-bit, 2-bit, 4-bit, 12-bit, 16-bit, etc. precision are also quite possible.

As previously discussed, in addition to the actual fingerprint sensing elements, commercially available partial fingerprint sensors, such as the Validity VFS131 and VFS201 sensors, also contain additional sensors that can be used to determine relative finger location or motion as well.

The VFS131 uses a series of electrical sensing plates to determine the relative position of the bulk of the finger. In contrast to the electrodes used to determine the fine structure of the fingerprint ridges and valleys, these electrical sensing plates sense the location of the bulk of the finger, and are differentially excited as the finger moves up and down over the course of a finger swipe.

The VFS201 finger location sensor works by a different method. Instead of finger location plates, the VFS201 contains two linear fingerprint sensors, each parallel to each other, and each separated by a distance of about 400 microns from the other. These two fingerprint sensors can be used to deduce fingertip position and velocity because a finger tip or ridge will first pass over one sensor slightly before the other. The relative timing difference between a fingerprint pattern arriving at the first sensor, relative to the same pattern, can be used to derive finger speed. By keeping track of this finger speed history, the relative position of the sensor relative to the finger pad can be computed. Both types of finger location sensors (used to track all details of finger movement, including velocity and acceleration) can encounter difficulties at the edge of a finger swipe. Some of these difficulties are illustrated in FIG. 1, below.

In FIG. 1 (100), a finger (102) is shown in the act of performing a finger swipe over a partial fingerprint sensor (104). The finger is moving towards the right (106) which for this discussion will be considered to be towards the user. The finger pad (108) is shown making contact with multiple finger location sensing plates (110), similar to those used in the VFS131 sensor. A partial fingerprint imager (112) images the fingerprint. While the finger swipe is in progress, generally the underside of the finger (108) will make good contact with many such sensing plates (110), producing multiple finger location signals that will produce an excellent signal allowing the finger location, motion, and acceleration to be determined with good precision at any time during a finger swipe. This allows each partial fingerprint image generated by partial fingerprint imager (112) to be precisely localized to a specific location on finger pad (108), which is required in order to reassemble these many partial fingerprint images into a complete fingerprint image of finger pad (108).

However, near the edge of the fingerprint swipe, such as when a fingerprint swipe is nearly over, the finger location sensors generally do not work as well. This problem is shown in FIG. 1 (120). Here the finger (122) has nearly completed the finger swipe. Although the finger is still in motion (124), the finger pad (108) may be in contact with only a few sensing plates (110), and this contact may not be as strong. As a result, the quality of the finger location signal returned by sensing plates (110) is not as high near the end of a scan, and thus the ability of the system to precisely identify what portion of the finger pad (108) is being imaged by the partial fingerprint imager (112) is reduced.

If this finger location error becomes too great, some of the later partial fingerprint images returned from imager (112), will normally have to be deleted from the final complete fingerprint image of finger pad (108) because the "Y" axis location of these final partial images cannot be precisely identified. This is unfortunate because this missing fingerprint information might be critical to later attempts to perform reliable fingerprint identification.

Note that the location of the linear (one dimensional) partial fingerprint image on the underside of finger pad (108) may be considered to be identified by a "Y" axis, where the Y axis indicates if the partial fingerprint image came from a position near the finger joint, or near the tip of the finger, or somewhere in between. In this disclosure, the "Y" axis convention that will be used is that a location near the finger joint (126) will be given a smaller (closer to 1) "Y" axis coordinate number, and a location near the finger tip (128) will be given a larger (greater than 1) "Y" axis coordinate number. In FIG. 1, the Y axis coordinate number is designated "n". Typically n may have a value between 1 and roughly 100, and this number will vary with the length of the finger, speed of the finger swipe, finger location resolution of the finger location detector, and imaging resolution of the partial fingerprint imager.

Figure 2:
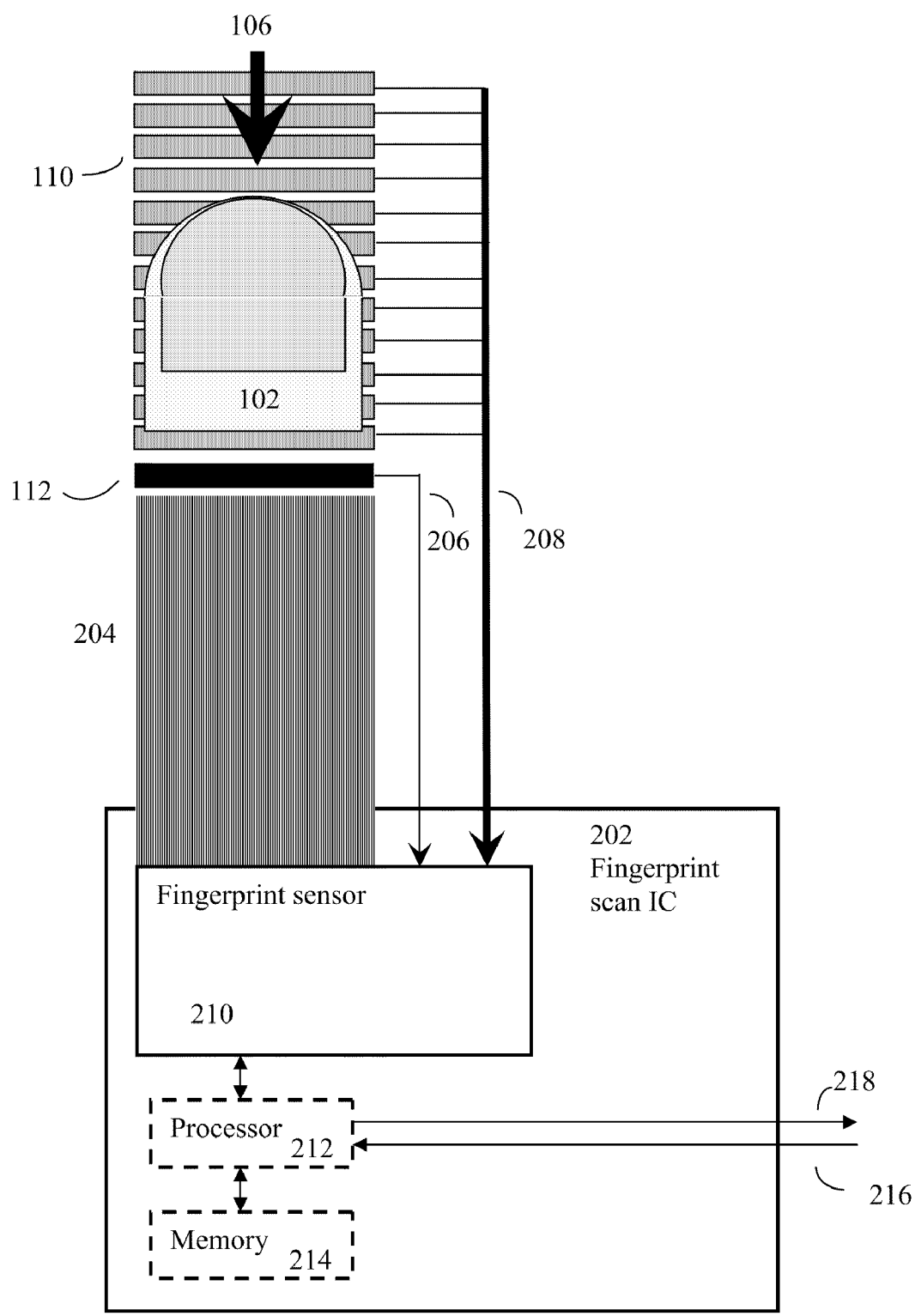
FIG. 2 shows a top view of a finger moving over a partial fingerprint scanner, showing the same view previously shown in FIG. 1 from a different perspective. Some of the circuitry used in this partial fingerprint scanner is also shown.

FIG. 2 shows a different, top view, perspective of the finger swipe passing over the partial finger print sensor previously shown in FIG. 1 (100). FIG. 2 also shows some additional detail of the electrical and processing circuits and components of this sensor system. In FIG. 2, as per FIG. 1, the finger (102) passes over the finger location sensing plates (110) and the partial fingerprint imager (112). Here for clarity, only the tip part of finger (102) is shown. The finger joint and the remainder of the user's finger and hand have been omitted because this would obscure certain parts of the diagram.

Both the location sensing plates (110) and the partial fingerprint imager (112) are connected to an integrated circuit (IC) chip sensor driver (202) by the various circuit traces (204), (206), and (208). The integrated circuit chip will usually contain sensing circuitry (210), and may also contain an optional processor circuitry (such as a microprocessor core) (212), and memory (214). IC chip (202) will usually also receive commands from external circuits (216), and send data back to these external circuits (218).

The processor (212) may be a microprocessor core such as an ARM or MIPS or 8051 or x86 or MSP430 or other processor core or logic comparison circuit, and memory (214) may be composed of volatile memory (such as RAM), or non volatile memory (such as FLASH or EEPROM) and may be compartmentalized into various types and security levels as appropriate. Here memory (214) can store various correction algorithms and methods (to be discussed), and can also serve as a cache to store the various partial fingerprint images and finger position, motion, and acceleration data. The memory can also contain scratchpad memory for the intermediate algorithm corrections as well.

In operation, the fingerprint scan IC can be set to perform the following fingerprint edge correction methods in a manner that is transparent to any additional processors residing outside of the IC. In this case, the problematic edge artifacts can be quickly and economically removed, and then output (218). This option will make it easy to incorporate the improved methods of the invention into existing systems. Alternatively the IC can expose some of the methods of the present algorithm to existing circuits outside the sensor, or even simply passively send the unprocessed data to these external circuits, in which case the methods of the invention may be performed on external devices residing outside of the sensor itself.

In either event, if the methods of the invention are adopted and incorporated into memory (214) and run by processor (212), subsequent fingerprint recognition systems will be simplified because there is a higher assurance that more complete fingerprints will be output by scanner chip (202). Scanner chip (202) can also receive commands (216) from outside circuitry to change its particular image edge correction algorithms, or even pass (transmit) raw (uncorrected) partial fingerprint image data directly, as needed.

Continuing with the discussion of FIG. 2, in use, a user finger (102) is swiped across the sensing elements (110), (112), and the fingerprint sensor module (210) of the chip (202) retrieves the data. Here, for example, partial fingerprint data can be obtained over the time course of the finger swipe and later assembled to construct a complete fingerprint. The algorithms by which swipe edge artifacts created by inadequate finger location sensing near the ends of a swipe can be corrected are discussed in more detail in the following figures.

Figure 3:
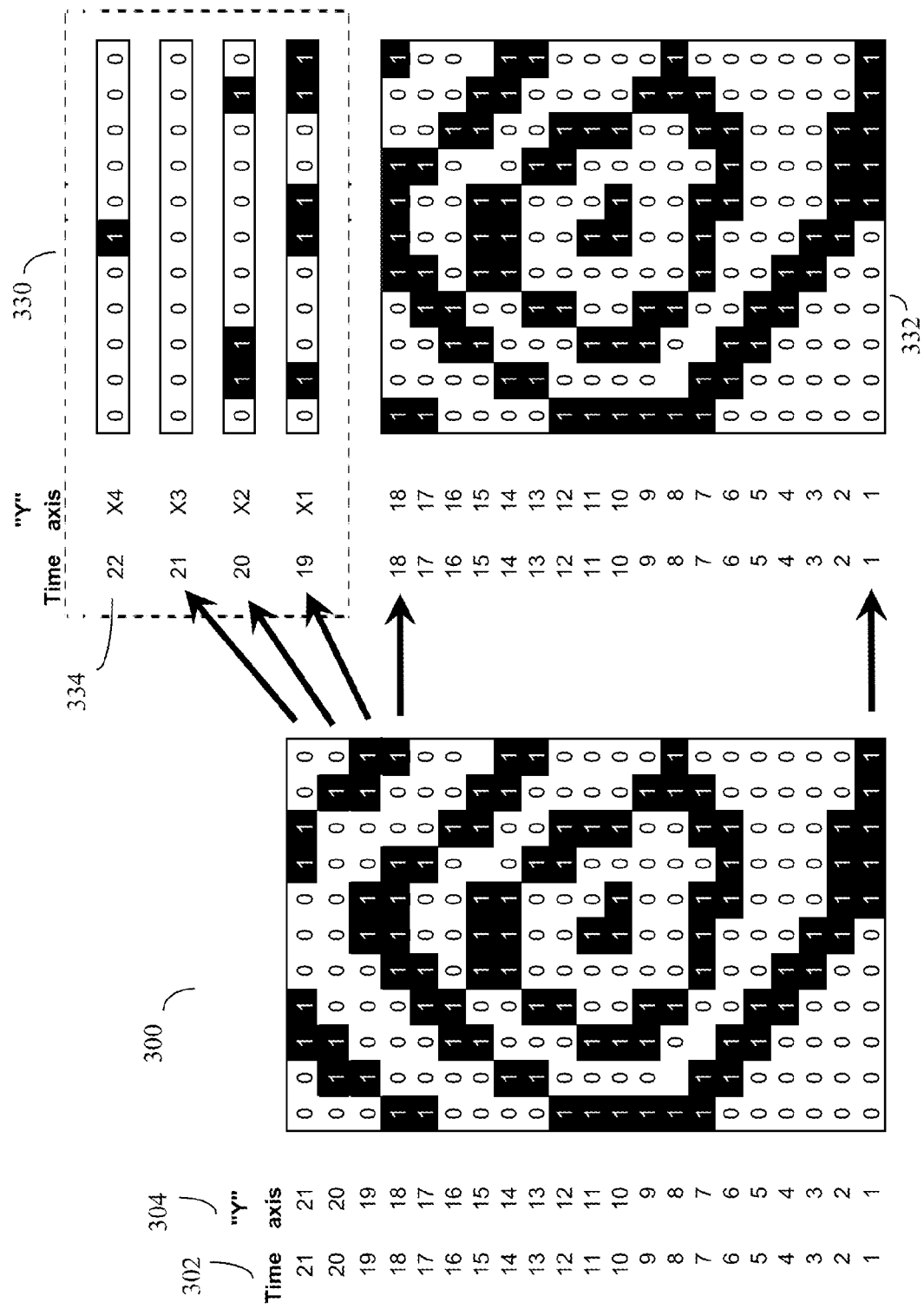
FIG. 3 shows an example of an "ideal" fingerprint that has been perfectly captured by an "ideal" partial (one dimensional) fingerprint scanner, as well as some of the problems and artifacts near the edges of the fingerprint scan that frequently occur in real scanners.

FIG. 3 shows an example of an "ideal" fingerprint that has been perfectly captured by a partial fingerprint scanner (300), as well as some of the fingerprint capture problems (330) that can occur near the end of a fingerprint swipe. In these examples, for simplicity, the output from a simplified hypothetical scanner that produces a much simpler output than a real scanner does is shown.

In this example, for simplicity, this hypothetical partial fingerprint imager (scanner) is depicted as having a very low spatial resolution (the linear partial image contains only 11 pixels) and the hypothetical scanner also has very low fingerprint-ridge depth-resolution (this simplified scanner has only 1 bit resolution, where 1=a ridge, and 0=a valley). By contrast, typical real partial fingerprint sensors usually have hundreds of detectors (pixels) arranged at high density (approximately 500 dots per inch is common) and real scanners also have much higher fingerprint depth resolution, such as 8-bit depth resolution.

In this simplified example, each row is a different one-dimensional partial fingerprint image from the linear fingerprint sensor, and the order (time) in which these partial images were taken is shown as the time coordinate (302). Thus each partial fingerprint image has its own row. Since the finger was moving, each partial fingerprint image comes from a different part of the underside of the finger (fingerprint). The "Y" coordinates of these partial fingerprint images are also shown (304). These "Y" values follows the same Y-axis numbering system previously discussed in FIG. 1. As before, the smaller "Y" values represent an area on the underside of the finger (fingerprint) that is closer to the finger joint. The larger "Y" values represent portions of the fingerprint that are closer to the finger tip.

In this simplified example, the fingerprint ridges (pixel value of 1) are shown in black to allow these ridges to be more easily visualized. Here each linear (one dimensional) partial fingerprint image is only 11 pixels by 1 pixel in size, and it takes only 21 of these simplified linear partial images to create a "complete" simplified two dimensional fingerprint scan. The location on the finger pad where each partial image was obtained (in arbitrary distance units) is shown in the "Y" axis column. This information is normally obtained from a finger position sensor. As can be seen, the full simplified two dimensional fingerprint scan, produced when all 21 simplified partial fingerprint images are assembled, shows a portion of a "loop" fingerprint.

In this simplified example, there is a 1:1 relationship between the time that a partial fingerprint image was obtained, and the "Y" axis coordinate. If this were actually the case, finger location sensors would not be needed. Unfortunately, this ideal situation never occurs in real life. In actuality the finger velocity and acceleration are different between users, and also change greatly during the course of a finger swipe.

Because of this lack of 1:1 relationship, precise finger location data must be generated by finger location sensors, and when such precise finger location data is absent (such as near the edges of the finger swipe), prior art methods simply determined that the location of the partial fingerprint images was unknown, and discarded these partial fingerprint images.

In FIG. 3 (300), the simplified "ideal" fingerprint scan has gone perfectly. The user has moved the finger over the partial finger print sensor at a uniform and ideal rate of speed, and the finger location sensors have worked perfectly throughout the scan. Thus a perfect fingerprint image has been captured. As previously discussed however, real sensors produce different results. FIG. 3 (330) shows some of the edge detection problems that can occur with real sensors, and here it may be useful to occasionally refer to FIG. 1 (120) to follow the discussion.

As previously discussed in FIG. 1 (120), near the end of a finger swipe, it is often difficult for the finger location sensors (110) to precisely determine the location of the edge of the finger (122). Although, as can be seen in (120), the partial fingerprint imager (112) is still capable of returning adequate images of the finger pad (108) on the underside of the finger under these conditions, the lack of good finger position data makes the "Y" axis location of these images indeterminate. This problem is shown in FIG. 3 (330).

Consider the difference between the partial fingerprint images obtained during time points 19-21 on the perfect fingerprint example (300), and the partial fingerprint images obtained during time points 19-21 in the more realistic fingerprint example (330). In the ideal or perfect example (300), the finger location sensors have continued to work properly during time points 19-21, and thus each partial fingerprint image returned during this time has a precise "Y" axis or coordinates. In this very simplified example, Time value 19 has a Y axis value of 19, Time value 20 has a Y axis value of 20, and Time value 21 has a Y axis value of 21. Even though in real life, this 1:1 mapping will not apply, as long as the finger location sensor data is good, the location of the partial fingerprint images can at least be calculated and precisely known.

In the more realistic example (330), the finger location sensors (FIG. 1 (110)) have stopped working adequately near the end of the finger swipe. As a result, although each partial fingerprint image returned during time values 19, 20, and 21 has a precise time value, the location of these images on the finger pad "Y" axis is not precisely known. These unknown location values are shown as X1, X2, and X3. These "unknown Y-axis" partial fingerprint images (330) are thus shown separated from the remainder of the fingerprint (332). By contrast, the remainder of the fingerprint (332) contains known Y-axis values obtained when the finger location sensors were working adequately.

Two additional differences between the more realistic situation shown in FIG. 3 (330) versus idealized FIG. 3 (300) are that in the more realistic example (330), the fingerprint image from the tip of the finger (Time 21, "Y" axis X3) has not been properly read by the partial fingerprint imager, and the data also contains an additional partial fingerprint image (334) that was not previously shown in the ideal example (300). The corrupted partial image and the additional partial fingerprint image (334) (representing Time 22, "Y" axis X4) results from the fact that in real life, since the finger location sensors often don't work well near the end of a finger swipe, the end of the swipe thus is somewhat indeterminate. As a result, the fingerprint sensor is going to either take too many or too few partial fingerprint images.

Thus in this more realistic example (330) the partial fingerprint imager (112) has generated an additional, almost blank, image (334) after the tip of the finger (122) has passed the imager (112). If the corrupted images or the blank images are appended to the fingerprint image, the final fingerprint image will contain inaccurate data.

Prior art systems, which were unable to deal with the problems exemplified by the partial fingerprint scans (330), dealt with these problems by simply truncating the tip of the fingerprint image. Thus a prior art partial fingerprint system might simply return a truncated partial fingerprint image similar to FIG. 3 example (332), which only has 18 rows of data. Since, in general, more complete fingerprint images are more desirable, these prior art techniques that cope with real world problems by simply throwing away the potentially valuable fingerprint edge data are clearly suboptimal.

The invention's improved analysis methods, which allow partial fingerprint scanner systems to process more of this formerly discarded data, are discussed in the next figures.

In order to create more ideal fingerprint images, two problems need to be addressed. 1) the "Y-axis" (coordinates, location) of the partial fingerprint images obtained after the finger position detectors have stopped functioning properly must be reported with higher accuracy; 2) since in the absence of precise finger position sensors, the edge of the finger is thus somewhat indeterminate, steps must be taken to continue to obtain partial fingerprint images up to the very edge of the finger, but images from beyond the edge of the fingertip must not be then used in the final fingerprint images. The invention accomplishes both goals in an elegant manner.

Fingerprint scanners are intended to be used by a wide variety of different individuals, who in turn use the scanners with a wide variety of different techniques. Some users swipe their fingers quickly. Some users swipe their fingers slowly. Some users move their fingers in a smooth and relatively uniform manner, while other users move their hands in a jerkier manner.

Although experimentally, a very wide variation in finger motion is thus observed between users, surprisingly one aspect of finger motion is seen to be relatively constant. This relatively invariant characteristic is that towards the end of a finger swipe, the user's finger acceleration is always remarkably constant. Although the finger swipe velocity itself differs greatly between users, but the end finger swipe acceleration, for some reason, is seen to always level off to a different constant value for each user.

More specifically, it has been experimentally found that finger acceleration during a finger swipe tends to follow a predictable pattern, in which finger acceleration initially starts at a lower value during the beginning of a swipe, then increases, and finally levels off during the last stages of a finger swipe. Users that start to swipe their fingers in a smooth manner tend to continue the smooth swipe throughout, and users that start to swipe their fingers in a more jerky (higher acceleration manner) tend to maintain this jerk or acceleration throughout.

It is tempting to speculate that this underlying consistency in final finger accelerations observed across many users performing finger swipes may have some physiological underpinning. The user's nervous system may command muscles to initiate a swipe with a particular speed and acceleration. During the brief duration of the swipe, the user's muscles may then carry out this initial command with relative precision, and there is insufficient time during the swipe for the user to send a command to move the muscles with different acceleration. Thus the initial set of muscle commands produces the observed constant terminal acceleration effect. Regardless of the underlying mechanism, the invention teaches that this experimentally observed aspect of finger swipe motion can be employed in methods to reduce the errors and artifacts commonly encountered near the edge or end of finger swipes.

In the present method, the location of the user's finger is continually tracked by the finger location sensors FIG. 1 (110) though out a swipe, and the velocity and acceleration are continually computed during this time. As the finger location sensors indicate that the finger is approaching the end of a swipe, where the finger location data from sensors (110) is known to become increasingly inaccurate, the methods of the invention teach that it is advantageous to switch to an alternate method of computing the finger location data. This alternate method computes that the "Y" axis (location) on the user's fingerprint based on the Y-axis location of the various partial fingerprint images returned earlier during the swipe.

In the method of the invention, finger acceleration versus time is continually computed, and the final acceleration of the finger as it approaches the last part of the motion sensors where finger position data becomes less accurate is calculated by extrapolation. This extrapolated finger acceleration data "a" is then used to compute finger location during the last part of the finger swipe, using typical physics equations of motion such as:

$$s = \frac{1}{2}at^2 \qquad \text{Equation 1}$$

Here "s" is the additional distance that the fingertip has moved since it passed the last reliable finger location sensor reading (plate) (110), "a" is the experimentally determined finger acceleration as the finger approaches the boundary where accurate finger location data is no longer available, and "t" is the time (usually in fractions of a second) elapsed between the end of the accurate finger location data, and the time when the particular partial fingerprint image of the edge of the finger is being taken.

Although this equation is being given by example, it should be apparent that depending upon the details of the fingerprint scanner an sensor in question, this equation may be modified or altered to provide the best results for that particular system.

Although the invention's method of filling in the missing or inadequate finger position data near the edge of a swipe by extrapolating the final finger acceleration can be used on a stand-alone basis to generate fingerprints that are superior to prior art fingerprints, additional improvements are also desirable. As previously discussed, an additional problem that is often encountered during the edge or final portions of partial fingerprint scans is the problem of either terminating the scan too soon (loosing data) or alternatively terminating the scan too late, and accidentally including non-fingerprint partial images into the fingerprint data image. Neither situation is good. The invention uses image analysis techniques to address this second type of problem. Although these image analysis techniques will be often be combined with the finger location extrapolation techniques discussed previously, either method (finger location extrapolation or image analysis) may also be used separately.

Just as a variety of different motion extrapolation algorithms may be used to compute finger motion and partial fingerprint image Y-axis coordinates, so a variety of different image analysis methods may also be used.

The standard deviation (STDEV) function is one example of an image analysis algorithm that may be usefully employed for the invention. Here, the standard deviation (STDEV) function is applied to the one dimensional array of "N" pixels that make up a single partial fingerprint image.

$$STDEV = \sqrt{\frac{1}{N}\sum_{i=1}^{N}(x_i - \bar{x})^2} \qquad \text{Equation 2}$$

In this equation, $\bar{X}$ is the average height or pixel intensity value across all pixels in a given one-dimensional partial fingerprint image, and $x_i$ is the pixel value of a given pixel in this one-dimensional image.

The reason why the standard deviation function works for these purposes is because fingerprints consist of a series of finger ridges separated by valleys. As a result, applying the standard deviation (STDEV) function to the average valid partial fingerprint image produces a relatively high standard deviation value. By contrast, a partial fingerprint image from a non-fingerprint region, such as empty space or perhaps a blank frame with some noise, will tend to be more uniform, and its standard deviation will be lower.

Thus, as one simple example of a suitable image analysis algorithm, either all partial fingerprint images, or alternatively partial fingerprint images from regions of the finger suspected of being on the border between fingerprint and non-fingerprint regions, may be analyzed by a standard deviation function. Those partial fingerprint images that have too low (too small) a standard deviation are likely to be non-fingerprint regions, and these partial fingerprint images may then safely discarded.

It should be evident that there are a very large number of alternative image analysis algorithms that may be used for this purpose. For example, although the standard deviation equation works adequately, computing the square root portion of a standard deviation algorithm is somewhat wasteful of computational resources, and isn't really necessary, because computing the square of the STDEV function will accomplish the same goal, yet avoid much of the computational overhead, so an $STDEV^2$ function will work as well. Alternatively, since fingerprint ridges usually have a characteristic spacing, other algorithms that sense such periodic spacing, for example, variance, analysis of variance (ANOVA) functions, analysis of covariance (ANCOVA), squared deviations, T-tests, and Fourier analysis algorithms may also work quite well. Essentially any mathematical algorithm may be used for this purpose, as long as the algorithm adequately distinguishes between the relatively more complex series of ridges and valleys present in a valid partial fingerprint image, and the usually simpler and partially blank images usually encountered in non-fingerprint data.

The methods of scanning and interpreting partial fingerprint images may also differ. Although most of the examples here teach algorithms that function within partial fingerprint images, algorithms that compare pixels between partial fingerprint images may also be quite useful. Since the tip of a finger is usually curved, often the side borders of a fingerprint scan of a fingertip will be blank, but the center of the image will contain useful fingerprint data up until the very tip of the finger.

In order to cope with this later type of situation, in addition to scanning pixels within a single partial fingerprint image (horizontal image analysis), it additionally may be useful to perform image analysis between different partial fingerprint images (vertical image analysis). In this later type of situation, it may be useful to construct vertical arrays (columns) consisting of the same pixel location between different partial fingerprint images.

Since most of these vertical arrays, with the exception of the portions of the arrays near the probable fingertips, will usually contain fingerprint data, if such vertical image interpretation methods are desired, it may be advantageous to break these vertical arrays down into smaller vertical sub-arrays or zones. For example, in the situation where a fingertip is being imaged, the top 10% of the vertical image arrays (columns) from the left and right sides of the image may contain non-fingerprint data, while the top 10% if the vertical arrays from the center of the image may still contain fingerprint data, due to the rounded nature of the fingertips. Here breaking the vertical arrays of the image down into smaller vertical zones (such as the top 10% of the vertical array, the next 10% below this, and so on), and analyzing the complexity of the image in each zone using a standard deviation function or other function, may also be useful. Vertical zones with image characteristics showing that they are likely to originate from the non-fingerprint regions to either side of the tapered tip of the finger may thus be removed or deweighted from the final fingerprint image.

Figure 4:
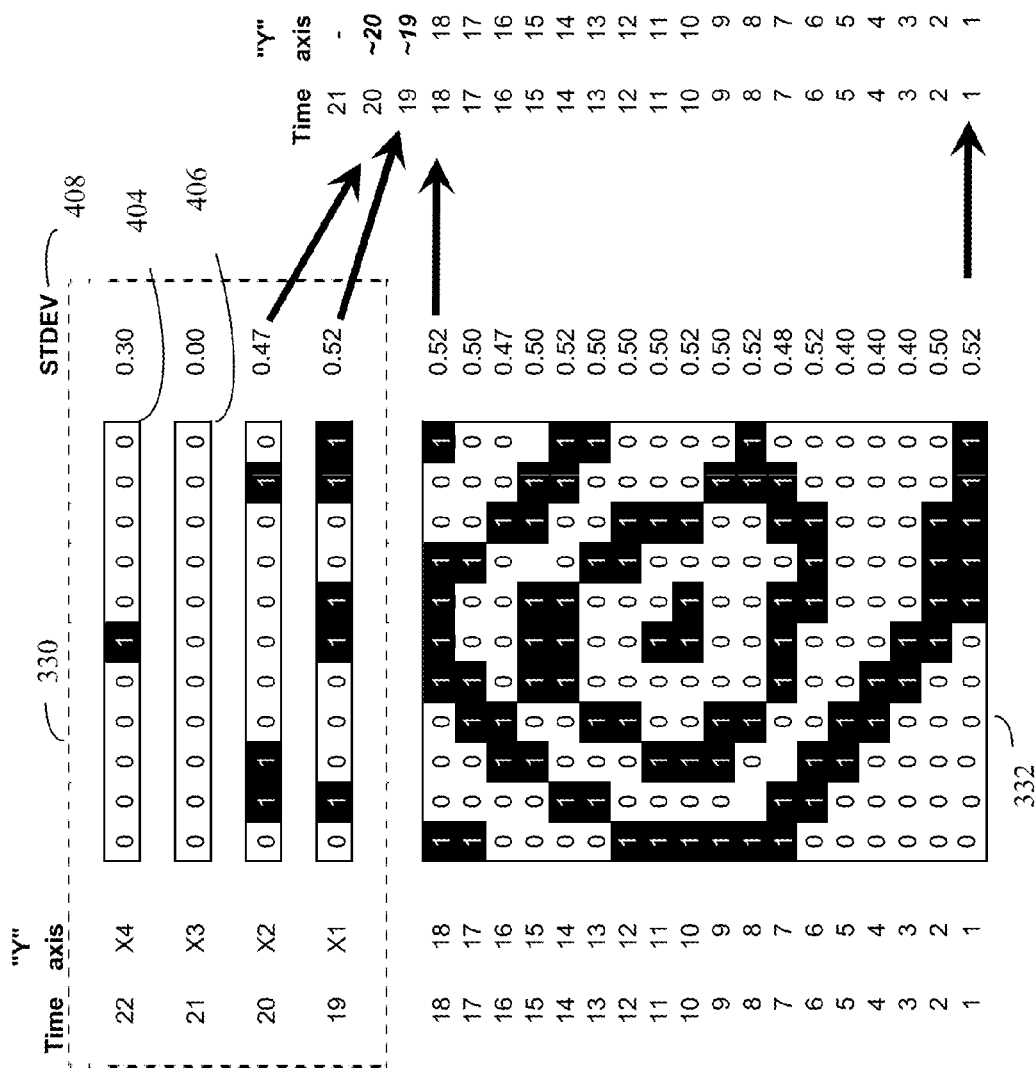
FIG. 4 shows how the methods of the invention can help correct for some of these problems and artifacts.

FIG. 4 shows an example of how the finger location extrapolation methods (method 1), and the image analysis methods (method 2), can be combined to produce an improved fingerprint image. In this example, the fingerprint scan previously shown in FIG. 3 (330) and (332) is being analyzed by both methods. Here, the goal is to salvage the marginal quality data from the end of the fingerprint scan (330), and reincorporate this data back into the main body of the fingerprint scan (332).

As before the first 18 rows of these images (332) were obtained when the finger position sensors were producing reliable results, and the last four rows (330) were obtained when the finger motion sensors were producing unreliable results (330). Thus the "Y" coordinates of the partial fingerprint images (330) are unknown; the time 21 partial fingerprint image (406) has been corrupted because it is near the tip of the finger; and the time 22 partial fingerprint image (404) is a non-fingerprint image containing some random pixels.

By extrapolating the finger motion data using the finger acceleration data collected during the swipe, the locations X1, X2 of the partial images collected during time 19 and 20 may be determined by using an algorithm similar to equation 1. However in this situation, appending the data taken at time points 21 and 22 (404), (406) to the final fingerprint image would be unwise because these partial fingerprint images do not contain fingerprint data.

Here, the fingerprint image analysis methods of method 2 and equation 2 can be used. As can be seen in (408), the standard deviation (STDEV) of each partial fingerprint image is computed. In this example, the criteria for a valid image can be set so that a STDEV of greater than 0.35 is considered a "valid" partial fingerprint image, and an STDEV of less than 0.35 will be considered an "invalid" partial fingerprint image. As can be seen, the last two partial fingerprint images (404) and (406) each have standard deviations less than 0.35, and thus will be excluded from the final fingerprint image. By contrast, all of the other partial fingerprint images (times 18-1) have standard deviations greater than 0.35, and thus are included in the final image. So the test is:

Partial image is good (OK) if STDEV−Criteria>0    Equation 3

By computing the missing "Y" axis data, and carefully determining where the cutoff is between the fingerprint data and the non-fingerprint data is using image analysis, the fingerprint may be reconstructed. This is shown in (410). Note that the "Y" axis values for times 19 and 20 are shown as ~19 and ~20 to indicate that these values have been derived by extrapolation, rather than directly from the finger position sensors. Note also that the corrupted partial fingerprint image (406) and the non-fingerprint data partial fingerprint image (404) have not been included in the final image (410).

Figure 5:
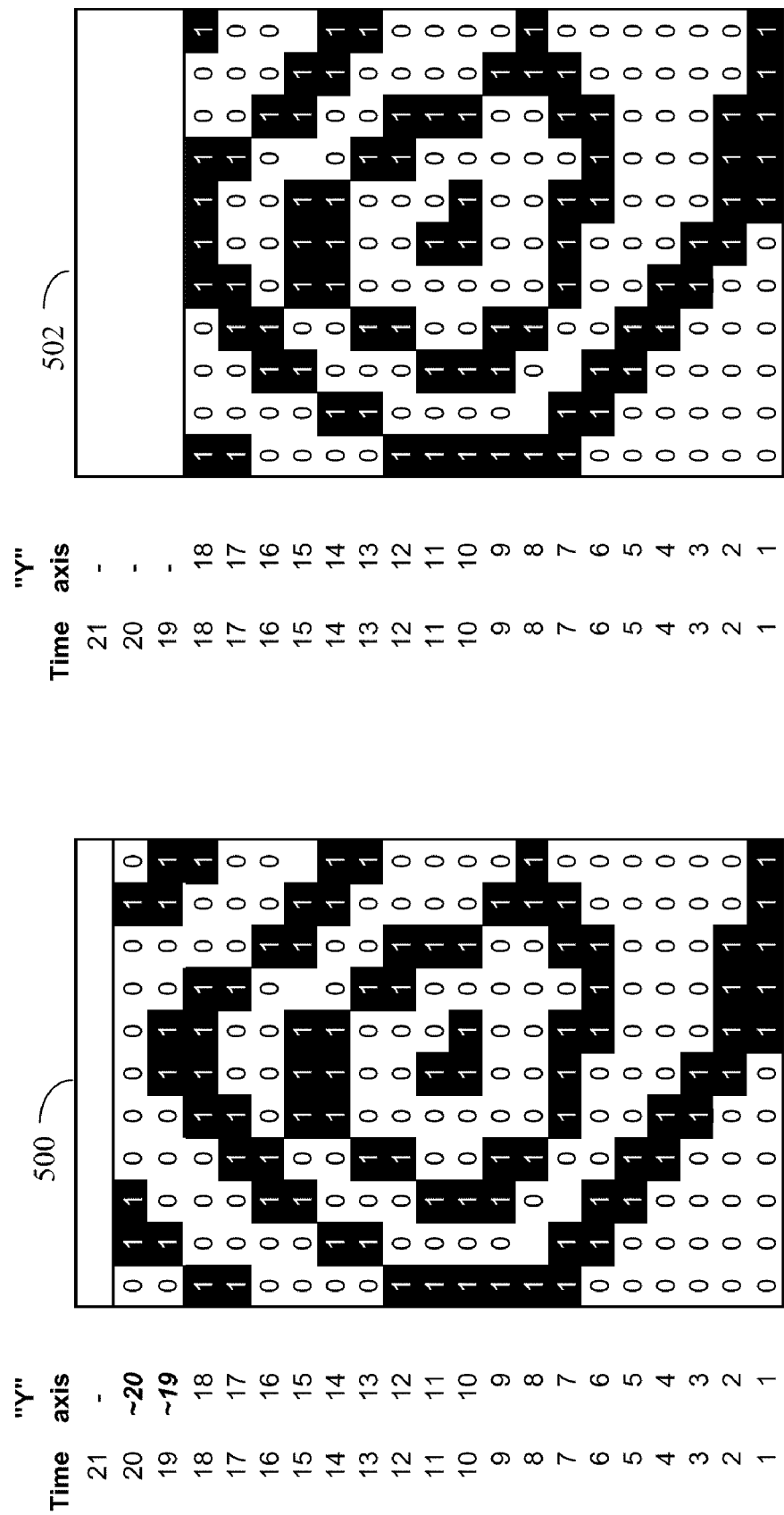
FIG. 5 contrasts the improved fingerprint edge results obtained using the methods of the invention to the less adequate results obtained using prior art methods.

FIG. 5 compares the present results (500) with prior art results (502). As can be seen, the present techniques enable the partial fingerprint data to be used more effectively than prior art approaches, and this produces a larger and more useful fingerprint.

Figure 6:
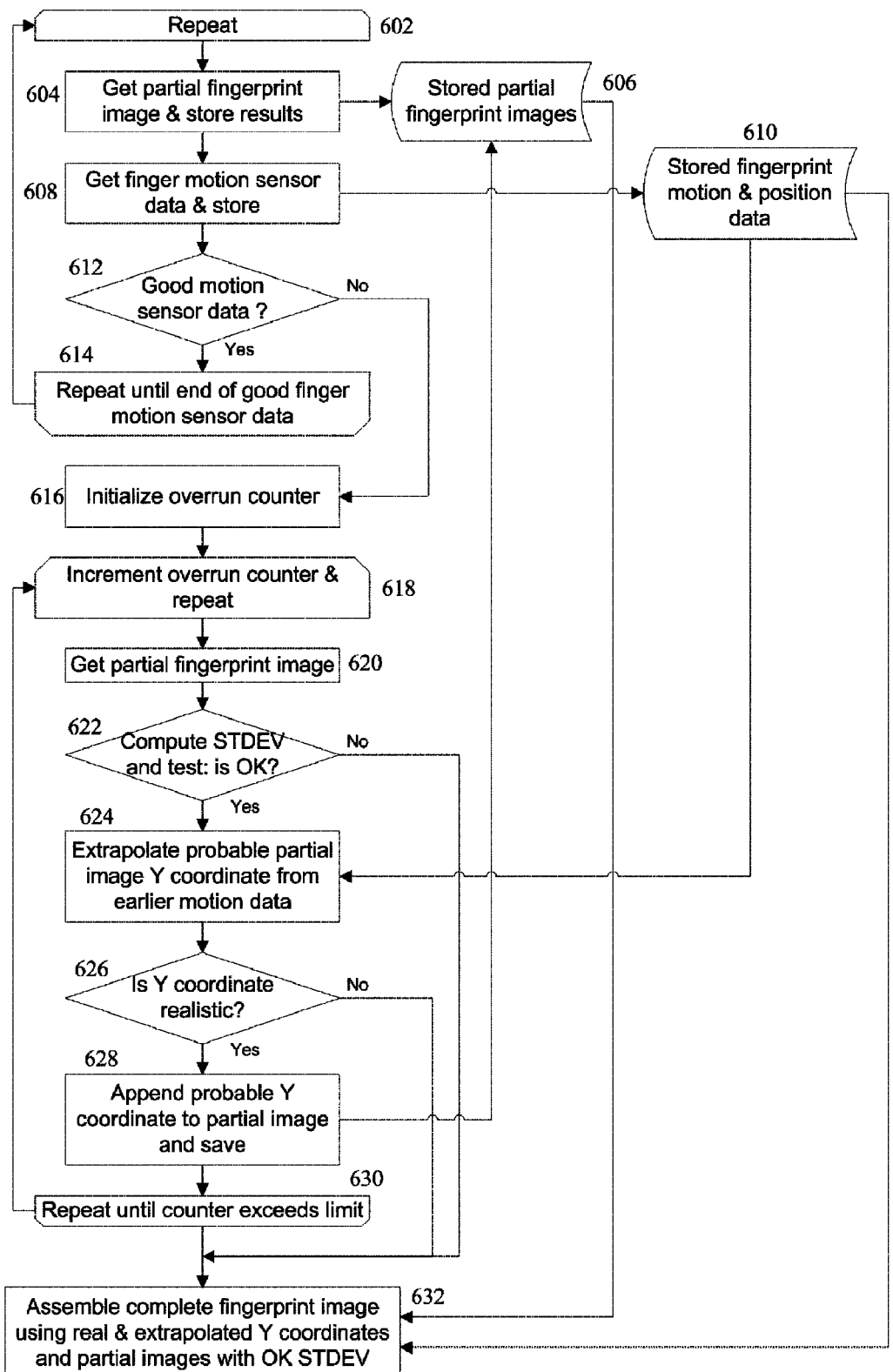
FIG. 6 shows a flow chart that uses the methods of the invention to correct for some of the problems and artifacts that can occur near the edges of a fingerprint scan.

FIG. 6 shows an example of an algorithm that implements the methods of the invention. This algorithm may be performed by microprocessor software or by dedicated circuitry. In one embodiment, the algorithm resides in the memory (FIG. 2 (214)) of the integrated circuit chip (202) that is used to drive the partial fingerprint sensor, and this algorithm is run on an embedded microprocessor core (212). Alternatively the algorithm may reside outside of the IC chip (202). In this case, IC chip may send partial fingerprint data and finger location data outside the chip via I/O line (218). In this case, the algorithm may reside or be implemented on circuitry outside of IC chip (202). Here the algorithm may be run on circuitry that is local to IC chip (202) (i.e. in the microprocessor of a laptop computer equipped with a fingerprint sensor), or the algorithm may be run remotely, such as on a server connected to the fingerprint sensor via a network. These algorithms may run either while fingerprint data is being collected, or after the data collection has completed.

The first part of the algorithm consists of a first loop in which partial fingerprint images and finger motion data are collected and stored. Here the loop begins at (602); partial fingerprint images are collected at (604) and stored in (606). The finger position and or motion sensor data (608) data is also collected (either before, during or after step 604) and this finger position data is also stored (610). The progress of the scan is monitored in (612). If the finger position sensors report that the finger is in a portion of the sensor where good finger location data can still be reported, then the loop continues (614).

However if the finger position sensors report (612) that the finger is nearing an edge of the scanner where finger location data is known to become unreliable, this first loop will then exit, and instead the algorithm will enter into a second, "finger overrun" routine (616).

This portion of the routine assumes that the finger tip is reaching the edge of the sensor, but that it may still be possible to obtain additional valid data. Thus the algorithm enters a second loop (618), (630) in which a number of partial fingerprint images are obtained, the exact number being set by the limit of the overrun counter, which in turn will be specific to the system's actual hardware.

The overrun algorithm first initializes the counter to a preset value, such as zero (616). The algorithm then continues to get partial fingerprint images (620), but now does some additional things as well. In this example, the partial fingerprint images (620) are analyzed on a real time basis as the images are actually acquired. Each time a partial fingerprint image is collected; the image is analyzed (in this example, using the standard deviation function) and compared to a preset "OK" value, such as the 0.35 value previously discussed in equation 2. If the image analysis shows that the partial fingerprint image is likely to be valid fingerprint data, then the algorithm next compensates for the lack of valid "Y" coordinate data by extrapolating the previously stored finger motion and acceleration data (610) according to methods similar to those previously discussed in equation 1. These "Y" axis values may be tested (626) and if the "Y" values suggest that the finger is still likely to be over the partial fingerprint sensor, and the finger image data looks valid, then the extrapolated "Y" axis values may be appended onto these partial fingerprint images (628), and these annotated partial fingerprint images are then stored (606).

This overrun process can continue until a overrun counter reaches a preset unit, or until the image analysis suggests that the image data is no longer that of a fingerprint (622), or until the calculated "Y" axis suggests that the fingerprint portion of the finger is no longer over the sensor (626). When any of these conditions are reached, the second loop then exits, and a complete fingerprint image can then be reassembled (632) using the stored partial fingerprint image data (606) and stored fingerprint location data (610).

Thus, as shown in FIGS. 4 and 6, it is useful to combine both the finger location extrapolation techniques of method 1 with the image analysis techniques of method 2. Combining methods allows a partial fingerprint scanner to scan a fingerprint image right up to the very edge of the usable fingerprint. This is because the finger location extrapolation techniques can be used to identify the location of the "edge" partial fingerprint images more precisely, allowing these edge partial fingerprint images to be included into the final fingerprint image if the images contain valid data. The image analysis techniques of method 2 can then be used to very precisely determine which of these edge partial fingerprint images should be used in the final fingerprint image, and which should not.

Returning to FIG. 2 and a discussion of circuitry, the time and position stamp data can be associated with the partial (one dimensional) fingerprint images by a variety of standard computer memory linkage methods. For example, each partial fingerprint image may contain a pointer to where the additional information associated with that particular partial image may be found in memory. Alternatively, the image annotation data (such as the time stamp and the finger location stamp) can be simply appended onto each partial fingerprint image, and stored in memory along with each partial fingerprint region. Generally, any linking method that reliably links annotation information with the partial fingerprint image data is adequate for these purposes.

As previously discussed, in one embodiment, the processing circuitry needed to implement this edge correction method may be implemented or placed on the same integrated circuit chip that is used to drive the partial fingerprint sensor. This embodiment simplifies overall circuit design, because the circuitry needed to edge correction algorithms need only operate when the fingerprint sensor itself is operated. In one configuration, the edge correction circuitry can intercept the partial fingerprint data as it is generated by the partial fingerprint sensor IC driver chip, perform the needed corrections, and the output from the partial fingerprint sensor can then automatically provide the corrected fingerprint data. This simplifies the task of any subsequent processor that might do analysis on the fingerprint image because a more complete and "cleaned up" image has been provided.

The algorithms used in this process can have adjustable parameters and options. As an example, in low security situations, when maximum user convenience is desired, it may be useful to set the finger motion extrapolation parameters to be relatively aggressive at making up for lost or suboptimal finger location data, and optionally also set the image analysis and rejection parameters to be less aggressive at rejecting partial fingerprint images.

If these parameters are chosen, a somewhat larger percentage of finger swipes will contain fingertip data that otherwise would have been truncated. When the system is being used by an authorized user, the system will tend to be somewhat more tolerant when the user deviates from ideal finger swipe technique, and thus will appear somewhat more "user friendly". This is because the fingerprints will contain more data, allowing the fingerprint pattern recognition algorithms to pick the user's fingerprint out of a database of authorized users more often. However the "cost" of this option is that there will be a greater chance that the final fingerprint scan may contain some errors. This is fine for lower security systems and systems where the quality of the fingerprint may not have to meet rigorous legal or law enforcement standards, but may not be best for these later applications.

Alternatively, in high security situations, or situations where the fingerprint scan may have to meet demanding legal and/or law enforcement standards, more rigorous settings may be appropriate. Here the image motion extrapolation parameters may be set to a less aggressive setting, and the image analysis and rejection parameters may be set to more stringent standards. This will make the system act in a slightly less user friendly manner because the scanner will then be less forgiving of deviations from ideal finger swipe technique, and will tend to throw out fingertip data more, but it will increase the fidelity and rigor of the fingerprint analysis.

Other variations and elaborations on these methods are also possible. Occasionally, the results obtained by method 1 and method 2 may conflict with each other. That is, the extrapolated finger motion data may indicate that the finger is no longer over the sensor, but the partial fingerprint image analysis suggests that the data is still representative of a fingerprint. Alternatively, the extrapolated finger motion data may indicate that the finger is still over the sensor, but the partial fingerprint image analysis suggests that the data is not valid fingerprint data. In such situations, the overall algorithm may be set to only take the data as valid if the two methods are in agreement, and to either reject or deemphasize (deweight) the data in any subsequent image analysis if the two methods are in disagreement. Alternatively, the image may be processed to "fade out" or reduce the contrast of the fingerprint regions in either these disputed regions, or in the regions where both methods are in agreement do not represent fingerprint data.

The invention claimed is:

1. A method of assembling a two dimensional image of a fingerprint from a series of one-dimensional linear fingerprint images, formed by a linear one-dimensional array of gap sensor elements aligned generally orthogonally to a direction of motion of a finger, comprising:
    obtaining position data versus time for the position of the finger as the finger swipes the linear one dimensional array, in the direction of finger motion;
    determining motion versus time for the finger, based at least in part on the position data versus time as the finger swipes the linear one-dimensional array;
    removing poor fingerprint image data contained in at least one of the series of one-dimensional linear fingerprint images, by determining from the motion a probable finger position in relation to the linear one dimensional array versus the time of the at least one of the series of one-dimensional linear fingerprint images; and
    including the at least one of the series of one-dimensional linear fingerprint images in the two dimensional image of the fingerprint based upon the probable finger position and an analysis of the content of the at least one of the series of linear one-dimensional fingerprint images.

2. The method of claim 1, wherein the including step compensates for loss of precise finger position data during at least a portion of the swipe of the finger.

3. The method of claim 1, in which the one-dimensional linear fingerprint images are obtained using a deep finger penetrating radio frequency (RF) based one-dimensional linear fingerprint imager.

4. The method of claim 1, in which the one-dimensional linear fingerprint imager has additional sensing elements capable of sensing the relative finger location or movement of the bulk of the finger.

5. The method of claim 1, in which the motion includes the group consisting of finger acceleration, velocity, or distance.

6. The method of claim 1, in which a coordinate or location of a one-dimensional linear fingerprint image in a complete fingerprint image is computed utilizing finger motion.

7. A method of assembling a two-dimensional image of a fingerprint from a series of one-dimensional linear fingerprint images, formed by a linear one-dimensional array of gap sensor elements aligned generally orthogonally to a direction of motion of a finger composed of multiple pixels, each pixel defined by gap sensor element, each pixel having a pixel value, the method comprising:
obtaining position data versus time for the position of the finger as the finger swipes the linear one dimensional array, in the direction of finger motion;
determining motion versus time for the finger, based at least in part on the position data versus time as the finger swipes the linear one-dimensional array; and
removing poor fingerprint image data contained in at least one of the series of one-dimensional linear fingerprint images, by determining from the motion probable finger position in relation to the linear one dimensional array versus the time of the at least one of the series of one-dimensional linear fingerprint images; and
including the at least one of the series of linear one-dimensional fingerprint images in the two dimensional image of the fingerprint based upon the probable finger position and an analysis of the content of the at least one of the series of linear one-dimensional fingerprint images.

8. The method of claim 7, in which the linear one-dimensional fingerprint images are obtained using a deep finger penetrating radio frequency (RF) based linear one-dimensional fingerprint imager.

9. The method of claim 7, in which the analysis of the content of the at least one of the series of linear one-dimensional fingerprint images is performed by a method selected from the group consisting of standard deviation, standard deviation squared, analysis of variance (ANOVA), analysis of covariance (ANCOVA), squared deviations, T-tests, and Fourier analysis of the pixel values within the individual partial fingerprint images.

10. The method of claim 8, in which the analysis of the content of the at least one of the series of linear one-dimensional fingerprint images is performed by a method selected from the group consisting of standard deviation, standard deviation squared, analysis of variance (ANOVA), analysis of covariance (ANCOVA), squared deviations, T-tests, and Fourier analysis of the pixel values between the individual partial fingerprint images.

11. The method of claim 7, in which analysis of the content of the at least one of the series of linear one-dimensional fingerprint images comprises setting a weight parameter associated with each pixel, the weight parameter indicating the relative importance for that particular pixel for subsequent image analysis;
in which reliable pixels, consistent with the image being a fingerprint image, are given a weight parameter indicating that the reliable pixels are important for subsequent image analysis; and
in which non-reliable pixels, consistent with the image being a non-fingerprint image, are deemphasized by being given a weight parameter indicating that nonreliable pixels are less important than the reliable pixels for subsequent image analysis.

12. The method of claim 7, in which analysis of the content of the at least one of the series of linear one-dimensional fingerprint images comprises adjusting the pixel value associated with each pixel, the pixel value indicating the relative contrast between the height and depth of the fingerprint ridges;
in which reliable pixels, consistent with the image being a fingerprint image, are treated so as to preserve the contrast between the relative height and depth of the fingerprint ridges;
in which non-reliable pixels, consistent with the image being a non-fingerprint image, are treated so as to diminish the contrast between the relative height and depth of the fingerprint ridges.

13. A method of assembling a two dimensional image of a fingerprint from a series of one-dimensional linear fingerprint images, formed by a linear one-dimensional array of gap sensor elements aligned generally orthogonally to a direction of motion of a finger, composed of multiple pixels, each pixel having a pixel value, the method comprising:
obtaining position data versus time for the position of the finger as the finger swipes the linear one dimensional array, in the direction of finger motion;
determining motion versus time of the finger, based at least in part on the position data versus time as the finger swipes the linear one-dimensional array;
removing poor fingerprint image data contained in at least one of the series of one-dimensional linear fingerprint images, by determining from the motion probable finger position in relation to the linear one dimensional array versus time as the finger swipes over the linear one dimensional array; and
assembling an image of a fingerprint from a series of linear one-dimensional fingerprint images, and including the at least one of the series of linear one-dimensional fingerprint images in the two dimensional image of the fingerprint based upon the probable finger position and an analysis of the content of the at least one of the series of linear one-dimensional fingerprint images for the presence of non-fingerprint image data.

14. The method of claim 13, in which the linear one-dimensional fingerprint images are obtained using a deep finger penetrating radio frequency (RF) based linear one-dimensional fingerprint imager.

15. The method of claim 13, in which the linear one-dimensional fingerprint imager has additional sensing elements capable of sensing the relative finger location or movement of the bulk of the finger.

16. The method of claim 13, in which the image of a fingerprint is subsequently analyzed versus a database of authorized fingerprint images for security verification purposes.

17. The method of claim 13, in which the motion includes the group consisting of finger acceleration, velocity, or distance.

18. The method of claim 13, including compensating for the loss of precise fingertip motion data in final portions of the finger swipe.

19. The method of claim 13, in which the analysis of the content of the at least one of the series of linear one-dimensional fingerprint images for the presence of non-fingerprint image data is determined by a method selected from the group consisting of standard deviation, standard deviation squared, analysis of variance (ANOVA), analysis of covariance (ANCOVA), squared deviations, T-tests, and Fourier analysis of the pixel values within the individual partial fingerprint images.

20. The method of claim 13, in which the analysis of the content of the at least one of the series of linear one-dimensional fingerprint images for the presence of non-fingerprint image data is determined by a method selected from the group consisting of standard deviation, standard deviation squared, analysis of variance (ANOVA), analysis of covariance (ANCOVA), squared deviations, T-tests, and Fourier analysis of the pixel values between the individual partial fingerprint images.

21. The method of claim 13, in which a coordinate or location of the at least one of the series of linear one-dimensional fingerprint images in the two dimensional image is computed using finger motion.

22. The method of claim 21, in which the analysis of the probable finger position versus time and the content of the at least one of the series of linear one-dimensional fingerprint images comprises selecting pixels where both the probable finger position versus time and the content of the at least one of the series of linear one-dimensional fingerprint images are in agreement that the pixel represents fingerprint data, and rejecting pixels where both the probable finger position versus time and the content of the at least one of the series of linear one-dimensional fingerprint images are in agreement that the pixel does not represent fingerprint data.

23. The method of claim 21, in which the analysis of the probable finger position versus time and the content of the at least one of the series of linear one-dimensional fingerprint images further comprises setting a weight parameter associated with each pixel, the weight parameter indicating the relative importance for that particular pixel for subsequent image analysis;
   in which non-disputed pixels, representing fingerprint data, are given a weight parameter indicating that the non-disputed pixels are important for subsequent image analysis;
   in which disputed pixels representing non-fingerprint data are given a weight parameter indicating that the disputed pixels are less important than the non-disputed pixels for subsequent image analysis.

24. The method of claim 21, in which the analysis of the probable finger position versus time and the content of the at least one of the series of linear one-dimensional fingerprint images further comprises adjusting the pixel value associated with each pixel, the pixel value indicating the relative contrast between the height and depth of the fingerprint ridges;
   in which non-disputed pixels, representing fingerprint data, are treated so as to preserve the contrast between the relative height and depth of the fingerprint ridges;
   in which disputed pixels, where there is disagreement that the pixel represents fingerprint data are treated so as to diminish the contrast between the relative height and depth of the fingerprint ridges.

25. A tangible machine readable medium storing instructions that, when executed by a computing device, cause the computing device to perform a method of assembling an image of a fingerprint from a series of partial fingerprint images and finger position data obtained by a partial fingerprint imager, comprising:
   assembling a two dimensional image of a fingerprint from a series of one-dimensional linear fingerprint images, formed by a linear one-dimensional array of gap sensor elements aligned generally orthogonally to a direction of motion of a finger;
   obtaining position data versus time for the position of the finger as the finger swipes the linear one dimensional array, in the direction of finger motion;
   determining motion versus time for the finger, based at least in part on the position data versus time as the finger swipes the linear one-dimensional array;
   removing poor fingerprint image data contained in at least one of the series of one-dimensional linear fingerprint images, by determining from the motion a probable finger position in relation to the linear one dimensional array versus the time of the at least one of the series of one-dimensional linear fingerprint images; and
   including the at least one of the series of linear one-dimensional fingerprint images in the two dimensional image of the fingerprint based upon the probable finger position and an analysis of the content of the at least one of the series of linear one-dimensional fingerprint images.

* * * * *